US012260877B2

(12) United States Patent
Giri et al.

(10) Patent No.: US 12,260,877 B2
(45) Date of Patent: Mar. 25, 2025

(54) MACHINE LEARNING DEFECT MANAGEMENT IN STORAGE DEVICES

(71) Applicant: Western Digital Technologies, Inc., San Jose, CA (US)

(72) Inventors: Saket Giri, San Jose, CA (US); Anand Lallan Gupta, San Jose, CA (US); Jonathan Lloyd, Newport Beach, CA (US); Amit Chattopadhyay, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/449,278

(22) Filed: Aug. 14, 2023

(65) Prior Publication Data

US 2024/0257835 A1    Aug. 1, 2024

Related U.S. Application Data

(60) Provisional application No. 63/482,232, filed on Jan. 30, 2023.

(51) Int. Cl.
*G11B 19/04*  (2006.01)
*G11B 5/596*  (2006.01)

(52) U.S. Cl.
CPC ........ *G11B 19/048* (2013.01); *G11B 5/59633* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 5,557,550 | A * | 9/1996 | Vigil | H02H 5/044 |
| 6,279,089 | B1 * | 8/2001 | Schibilla | G11B 20/1883 |
| | | | | 714/36 |
| 6,496,943 | B1 * | 12/2002 | Belser | G11B 20/1883 |
| | | | | 369/53.17 |
| 6,507,450 | B1 * | 1/2003 | Elliott | G11B 5/59655 |
| | | | | 360/77.08 |
| 7,929,234 | B1 | 4/2011 | Boyle et al. | |
| 8,014,094 | B1 | 9/2011 | Jin | |
| 8,149,528 | B1 | 4/2012 | Suratman et al. | |
| 8,711,500 | B1 * | 4/2014 | Fong | G11B 27/36 |
| | | | | 360/53 |
| 9,042,045 | B1 | 5/2015 | Dang et al. | |
| 11,650,167 | B2 | 5/2023 | Fam et al. | |

(Continued)

*Primary Examiner* — Peter Vincent Agustin

(57) ABSTRACT

Methods are provided for managing defects in Hard Disk Drive (HDD) storage devices. In particular, only a portion of the cylinders of an HDD is tested. Machine learning modeling is used to reconstruct the data for the untested cylinders. An HDD comprises a rotating disk and a read/write head actuated above the disk surface. The disk may be formatted into concentric data tracks, with each track being divided into sectors. The tracks may be organized into zones (groups of tracks called cylinders), and the axially parallel sectors in each cylinder may be organized into wedges. In a test mode, some portion of the cylinders is chosen for testing. Each wedge in the chosen cylinders is tested and labeled defective or non-defective. The test data for each defective wedge is run through a machine learning defect management logic, and inferences are made for the defective/non-defective status of the untested wedges.

23 Claims, 16 Drawing Sheets

(56) References Cited

U.S. PATENT DOCUMENTS

| | | | |
|---|---|---|---|
| 2009/0002866 A1* | 1/2009 | Shaver | G11B 5/012 360/51 |
| 2009/0195907 A1* | 8/2009 | Richmond | G11B 5/5543 360/71 |
| 2020/0251143 A1* | 8/2020 | Nangare | G11B 5/012 |

* cited by examiner

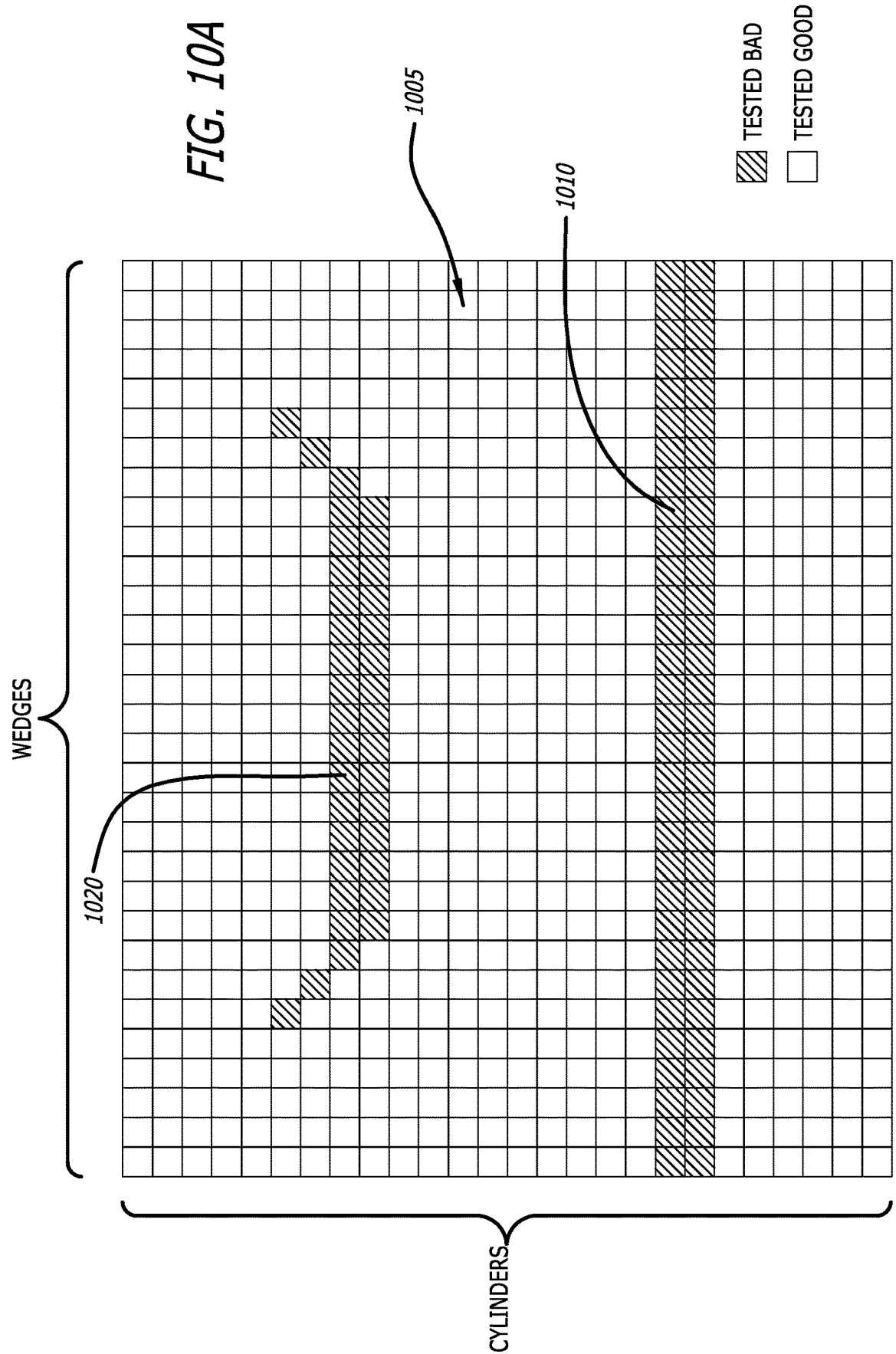

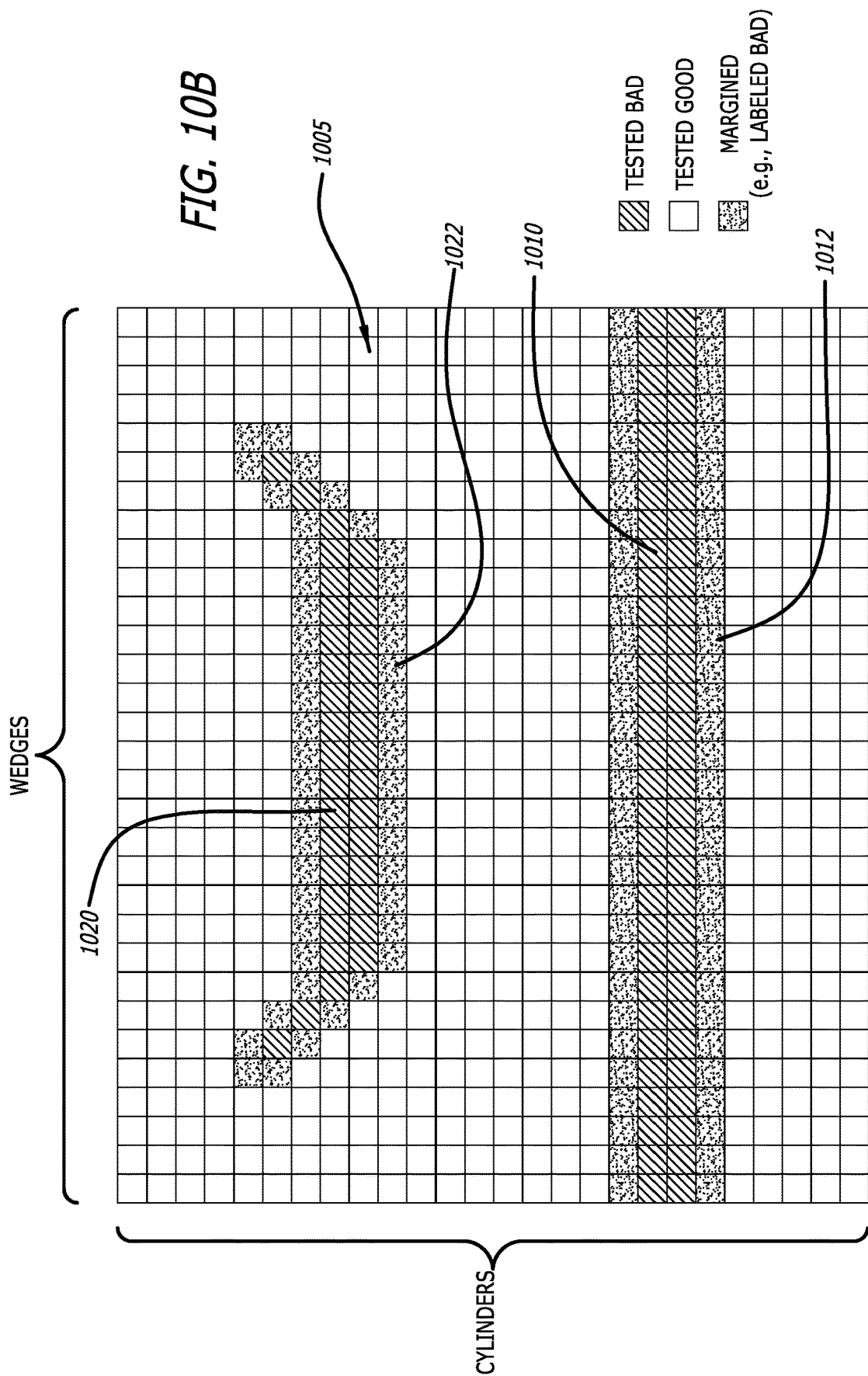

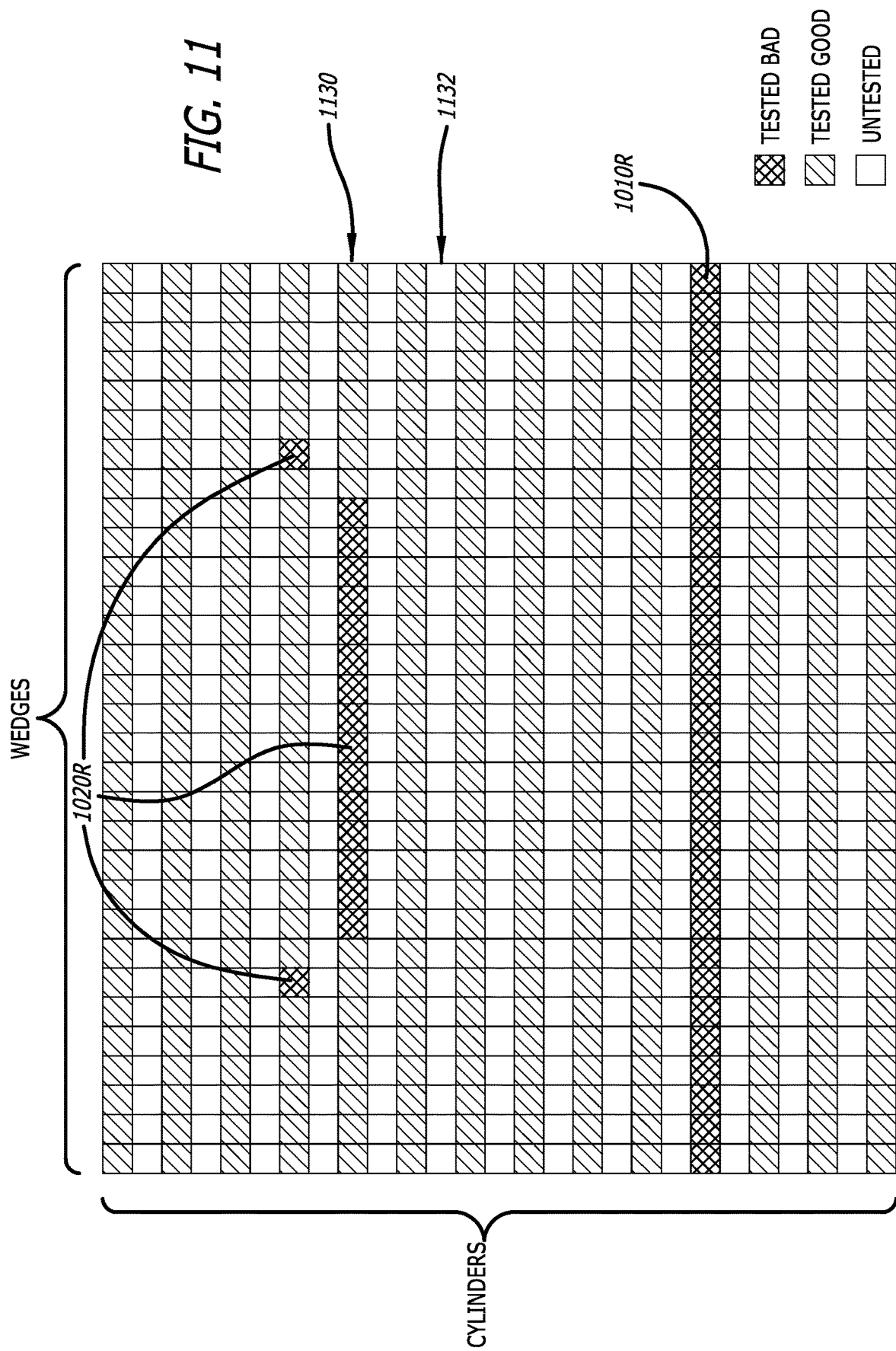

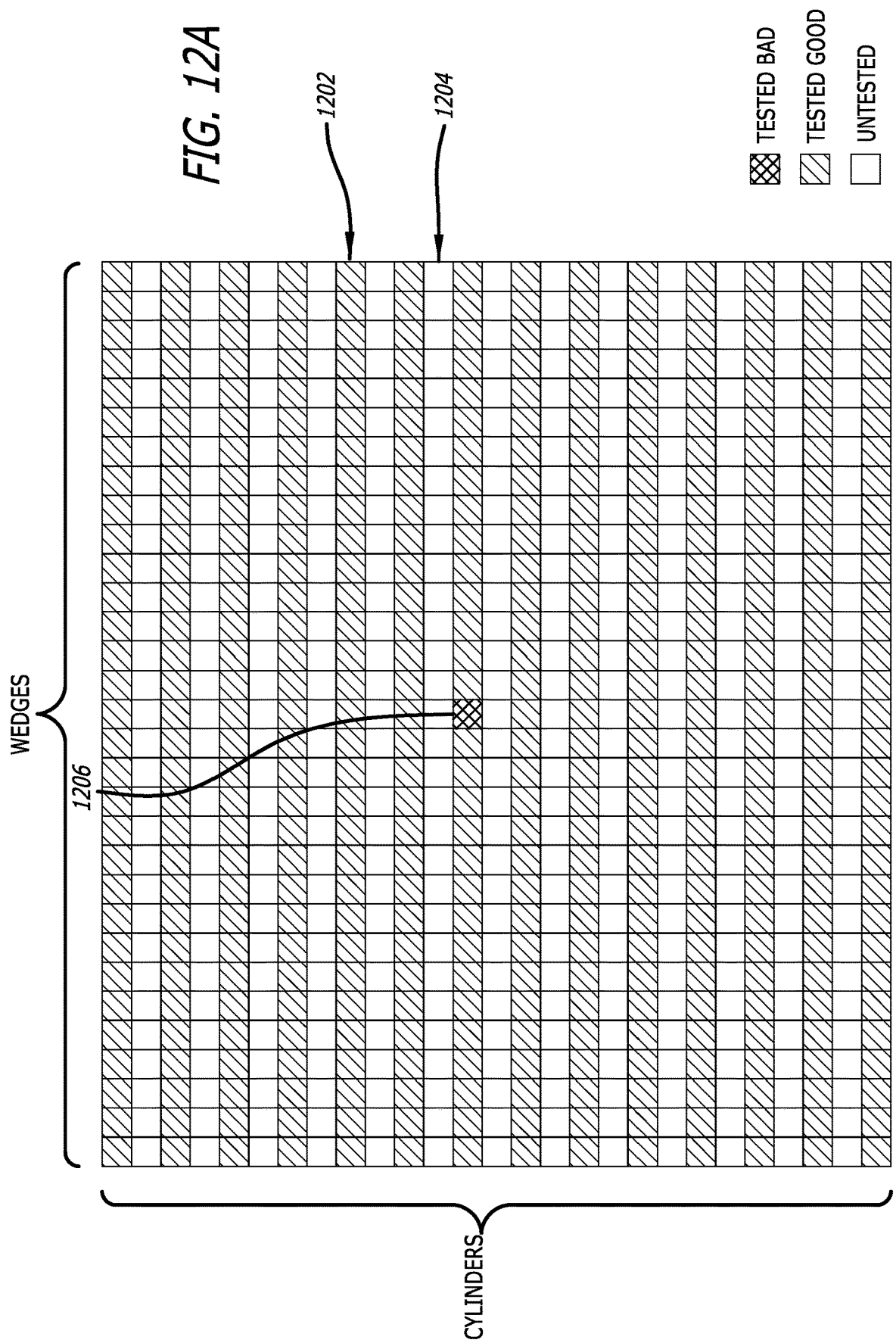

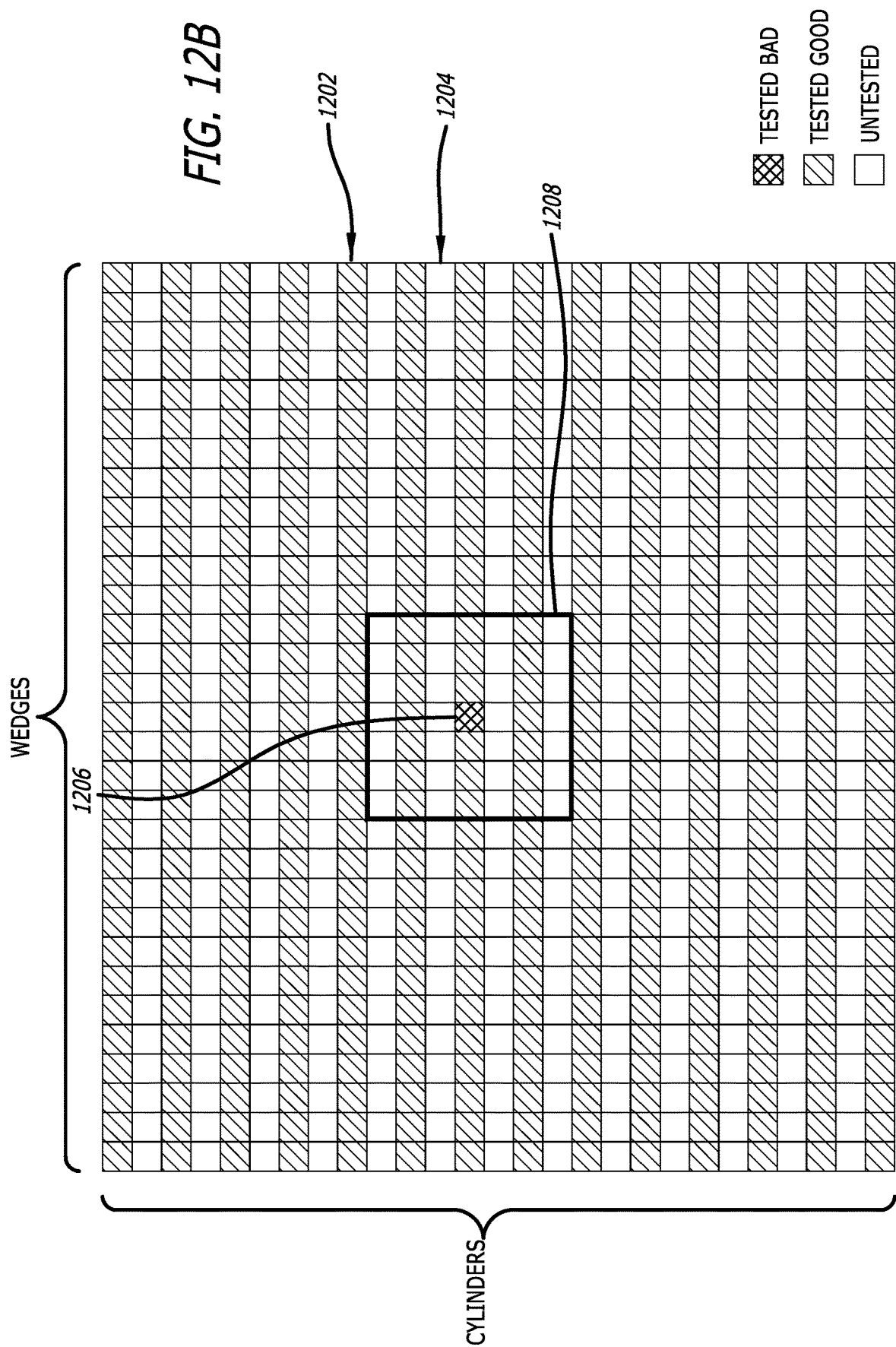

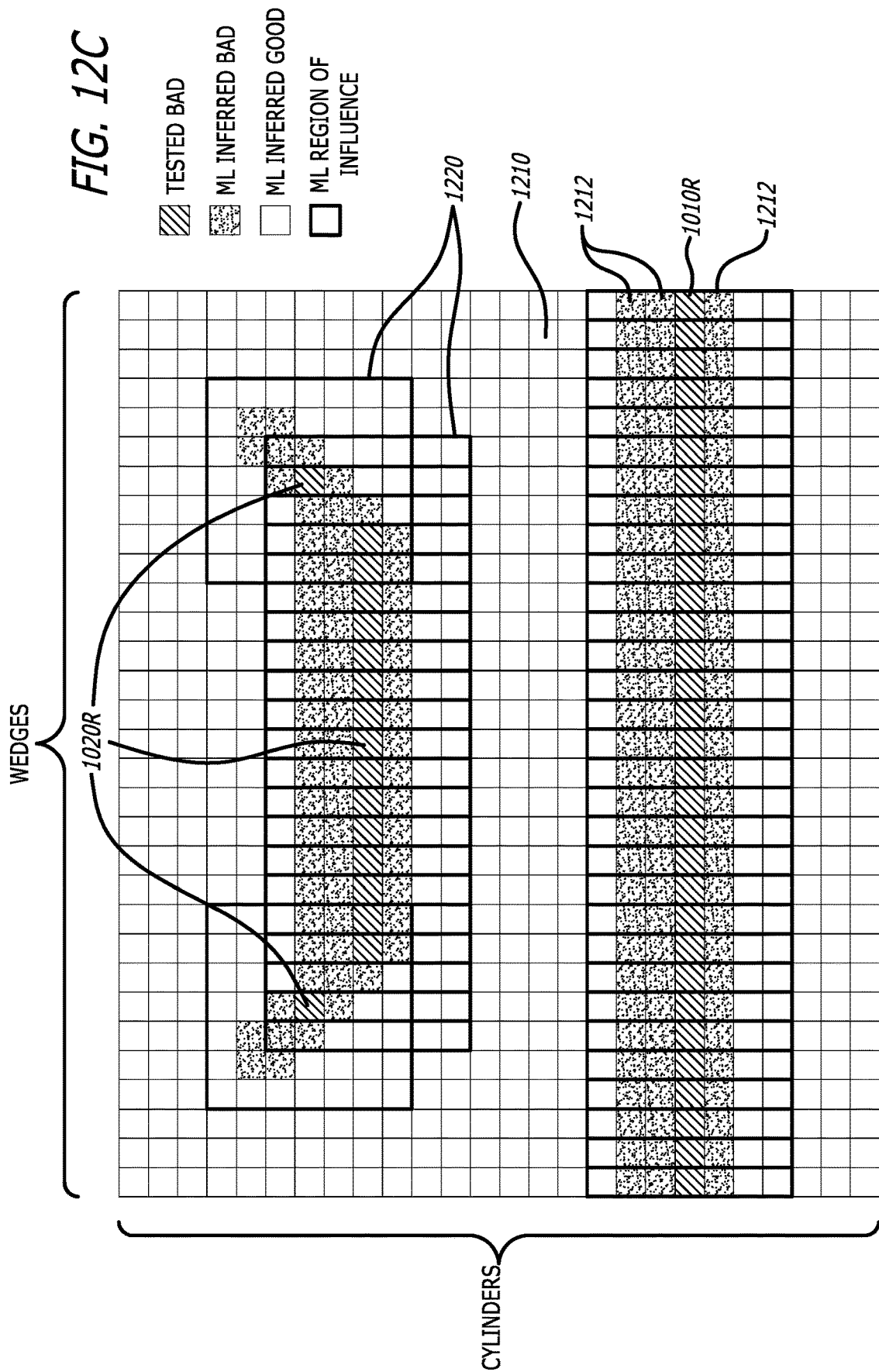

MACHINE LEARNING DEFECT MANAGEMENT IN STORAGE DEVICES

PRIORITY

This application claims the benefit of and priority to U.S. Provisional Application No. 63/482,232, filed Jan. 30, 2023, which is incorporated in its entirety herein.

FIELD

The present disclosure relates to storage systems. More particularly, the present disclosure relates to utilizing machine learning methods for defect management within existing storage device designs.

BACKGROUND

Current hard disk drive ("HDD") and solid-state drive ("SSD") storage devices often utilize embedded software that is executed within a System on a Chip ("SoC"). Traditional methods of software execution within storage systems are getting increasingly difficult to improve. As drive sizes and complexity grow, the number of variables and associated resources that need to be managed, searched, and optimized to improve on the state-of-the-art increases in complexity.

Certain algorithms may attempt to improve various operations within storage devices but often are limited by the internal processing power provided. Some methods of processing improvement may attempt to offload processing to an external host system either in direct communication with the storage device or via a remote processing device. However, these methods add complexity to the storage device system and can be rendered useless when communication fails with external processing devices.

Improving internal processing power within the storage device can also be problematic. Adding additional processors or specialized components to handle various processing tasks often requires an entire reworking of the circuits, circuit boards, and/or other hardware. These changes are not trivial and can add millions of dollars in capital investment costs to the manufacturing process. These hardware-based solutions may also be limited to addressing a particular problem whose solution may not warrant the costs needed to produce a change in hardware design.

BRIEF DESCRIPTION OF DRAWINGS

The above and other aspects, features, and advantages of several embodiments of the present disclosure will be more apparent from the following description as presented in conjunction with the following several figures of the drawings.

FIG. 10A is a diagram of a portion of a storage medium in accordance with an embodiment of the invention;

FIG. 10B is a diagram of a portion of a storage medium in accordance with an embodiment of the invention;

FIG. 11 is a diagram of a portion of a storage medium in accordance with an embodiment of the invention;

FIG. 12A is a diagram of a portion of a storage medium in accordance with an embodiment of the invention;

FIG. 12B is a diagram of a portion of a storage medium in accordance with an embodiment of the invention;

FIG. 12C is a diagram of a portion of a storage medium in accordance with an embodiment of the invention;

Figure 1:
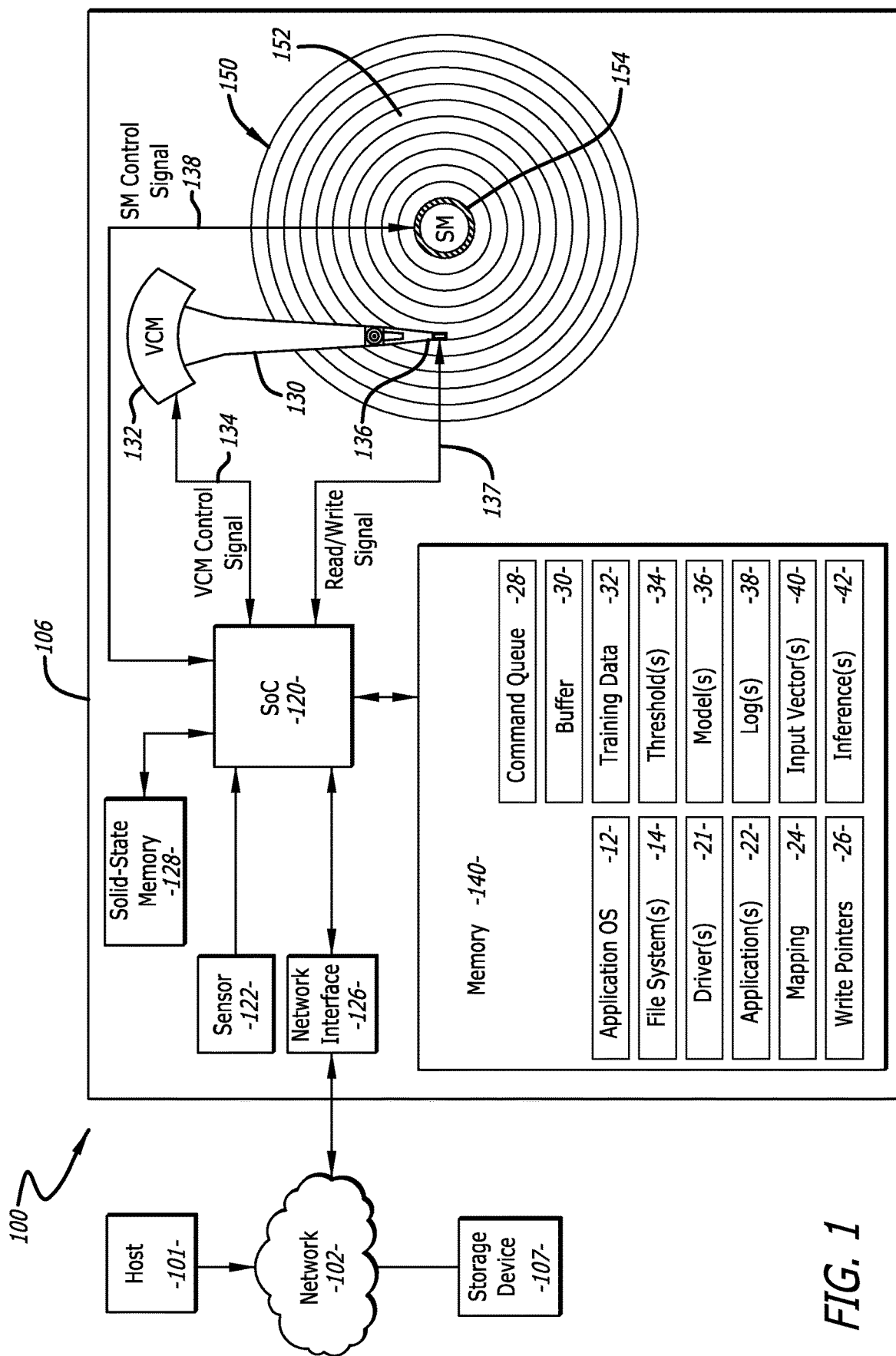
FIG. 1 is a block diagram of a storage device system in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements to facilitate understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the problems described above, various embodiments of the instant application provide for the tactical deployment of machine learning within existing storage device designs without additional capital investment. In many embodiments, machine learning operations can be processed within an SoC of a storage device as embedded software. By utilizing prior historical data, operations, and/or results, statistically driven decisions (i.e., inferences) can be generated. In other embodiments, some of the machine learning processing can be performed utilizing the computing resources of a host. This can be implemented with a device driver or some other method.

Machine learning methods can be utilized by generating one or more models that receive a series of input data and produces a desired output. Often, these machine learning models are produced by using one or more neural network designs. Challenges often occur operating machine learning models within typical storage device firmware, as the input and output scope can vary greatly and may not be known prior to firmware development.

However, various embodiments of the instant application can provide methods of dynamically generating and implementing machine learning models of different scopes as needed. For example, adjustments of the models can be designed to adjust for model complexity and/or projected processing time. It is contemplated that models of various complexities can be generated, selected, converted, and otherwise processed as needed to be run as code within the embedded software of the storage device.

Machine learning-based techniques can allow for an arbitrary amount of calculation complexity to be encapsulated in an information-dense and efficient way. The accuracy of a model can be configured to be tuned to trade off the calculation time versus accuracy without the need for a firmware engineer to make an excessive number of manual adjustments. These machine learning models can be designed to, for example, improve the accuracy of performance, reliability, manufacturing margins, yield increases, and/or manufacturing cost reduction. In further embodiments, an analyst or data scientist can define a more appropriate or efficient function for a particular model, which may then be updated via a firmware update without the need for further changes to the remaining software code.

Methods are provided for managing defects in storage devices. An HDD comprises a rotating disk and a read/write head actuated above the disk surface. The disk may be formatted into concentric data tracks (e.g., cylinders), with each track being divided into sectors. The tracks may be organized into zones, and the axially parallel sectors in each cylinder may be organized into wedges. In a test mode, some portion of the cylinders is chosen for testing. The number of cylinders chosen may be one-half, one-third, or some other fraction of the total cylinders present. Each wedge in the chosen cylinders is tested and labeled defective or non-defective. The test data for each defective wedge is run through a machine learning defect management logic, and inferences are made for the defective or non-defective status of the untested wedges.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "logic," "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but is not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computers and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, a programmable array logic, a programmable logic device, or the like (e.g., as firmware, a netlist, or the like). A circuit may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a block diagram of a storage device system 100 in accordance with an embodiment of the invention is shown. System 100 can include a host 101 and storage devices 106 and 107 in communication with each other through network 102. System 100 can be, for example, a data storage center or other computer system that uses multiple storage devices. In addition, system 100 may be a standalone system or part of a network, such as network 102, which can, for example, be a local or wide area network or the Internet. Those of ordinary skill in the art will appreciate that system 100 can include more or less than those elements shown in FIG. 1 and that the disclosed processes can be implemented in other environments. For example, in other embodiments, system 100 may only include host 101 and storage device 106 without storage device 107. In such embodiments, system 100 can be, for example, a computer system (e.g., server, desktop, mobile/laptop, tablet, smartphone, etc.) or another electronic device such as a digital video recorder or other consumer entertainment device.

In the embodiment depicted in FIG. 1, the storage device 106 can include one or both of solid-state memory 128 and rotating magnetic disk 150 as Non-Volatile Memory ("NVM") for storing data. If both are included, storage device 106 can be considered a Solid-State Hybrid Drive ("SSHD") in that it includes both solid-state and disk NVM. In other embodiments, storage devices 106 or 107 can include different types of NVM, such as, for example, a magnetic tape drive, or the NVM of storage devices 106 or 107 may only disk NVM or solid-state NVM. In yet other embodiments, each of disk 150 or solid-state memory 128 may be replaced by multiple Hard Disk Drives ("HDDs") or multiple Solid-State Drives ("SSDs"), respectively, so that the storage device 106 can include pools of HDDs or SSDs.

The embodiment of FIG. 1 also depicts the storage device 106, including a System on a Chip ("SOC") 120, which includes circuitry for executing instructions and can include a microcontroller, a Digital Signal Processor (DSP), an Application Specific Integrated Circuit (ASIC), a Field Programmable Gate Array (FPGA), hard-wired logic, analog circuitry, control circuitry, and/or a combination thereof.

An example arrangement of an SoC 120 is discussed in more detail below with reference to FIG. 2.

A network interface 126 is configured to connect the storage device 106 with a network 102 using, for example, an Ethernet connection or a Wi-Fi wireless connection. Network interface 126 allows storage device 106 to interface with other devices on network 102 (e.g., host 101 or storage device 107) using a protocol such as TCP/IP. As will be appreciated by those skilled in the art, network interface 126 can be included as part of the SoC 120. In other embodiments, the network interface 126 may be replaced with an interface for communicating on a data bus according to a standard such as Serial Advanced Technology Attachment ("SATA"), PCI Express ("PCIe"), Small Computer System Interface ("SCSI"), or Serial Attached SCSI ("SAS").

Storage device 106 can also include a sensor 122 for obtaining environmental information about an environmental condition of the storage device 106. The sensor 122 can include one or more environmental sensors such as, by way of non-limiting disclosure, a mechanical shock sensor, a vibration sensor, an accelerometer (e.g., XYZ or YPR accelerometer), a temperature sensor, a humidity sensor, or an air pressure sensor. In addition, one type of sensor can be used to indicate multiple environmental conditions. For example, an accelerometer can be used to indicate both vibration and mechanical shock conditions, or an air pressure sensor can be used to indicate changes in altitude and changes in air pressure. In other embodiments, storage device 106 may obtain data from an external sensor such as a camera, a radio frequency sensor, or radar.

The disk 150 can be rotated by a Spindle Motor ("SM") 154. The storage device 106 may also include a head 136 connected to the distal end of an actuator 130, which is rotated by a Voice Coil Motor ("VCM") 132 to position head 136 in relation to the disk 150. The SoC 120 can control the position of the head 136 and the rotation of the disk 150 using a VCM control signal 134 and an SM control signal 138, respectively. SoC 120 may provide write data to head 136 or receive read data from head 136 via Read/Write Signal 137.

As appreciated by those of ordinary skill in the art, disk 150 may form part of a disk pack with additional disks radially aligned below disk 150. In addition, head 136 may form part of a head stack assembly, including additional heads, with each head arranged to read data from and write data to a corresponding surface of a disk in a disk pack.

Disk 150 includes a number of radially spaced and concentric data tracks 152 for storing data on a surface of disk 150. Tracks 152 can be grouped together into zones of tracks (sometimes called "cylinders"—particularly in cases with multiple disks 150 and heads 136 aligned vertically above and/or below each other), with each track divided into a number of sectors (sometimes called "wedges") that are spaced circumferentially along the tracks. In some embodiments, some or all of tracks 152 can be written by a write element of head 136 using Shingled Magnetic Recording ("SMR") so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136. In other implementations, all of tracks 152 may be written such that they do not overlap by using Conventional Magnetic Recording ("CMR").

In addition to, or in lieu of, the disk 150, the NVM media of the storage device 106 may also include solid-state memory 128 for storing data. While the description herein refers to solid-state memory generally, it is understood that solid state memory may comprise one or more of various types of memory devices such as flash integrated circuits, Chalcogenide RAM ("C-RAM"), Phase Change Memory ("PC-RAM" or "PRAM"), Programmable Metallization Cell RAM ("PMC RAM" or "PMCm"), Ovonic Unified Memory ("OUM"), Resistance RAM ("RRAM"), NAND memory (e.g., Single—Level Cell ("SLC") memory, Multi—Level Cell ("MLC") memory, or any combination thereof), NOR memory, EEPROM, Ferro electric Memory ("FeRAM"), Magnetoresistive RAM ("MRAM"), other discrete NVM chips, or any combination thereof.

Memory 140 can represent a volatile memory of storage device 106, such as Dynamic Random Access Memory ("DRAM"), for temporarily storing data used by SoC 120. In other embodiments, memory 140 can be an NVM such as MRAM. In addition, memory 140 can be included as part of SoC 120 in other embodiments. Those of ordinary skill in the art will also appreciate that other embodiments may include less than all of the items depicted as being stored in memory 140 while other embodiments may include additional items not shown in the figure.

In operation, a processor of SoC 120 (e.g., processor 210 shown in FIG. 2) accesses information stored in memory 140 during the execution of computer-executable instructions in software programs such as application Operating System (OS) 12, file system(s) 14, driver(s) 21, or application(s) 22. More specifically, SoC 120 can load computer-executable instructions from an NVM of storage device 106 (e.g., disk 150 or solid-state memory 128) into a region of memory 140 and then execute the stored process instructions from memory 140.

Application OS 12 can be an embedded OS or firmware of the storage device 106 in the sense that application OS 12 is executed on storage device 106 and not executed on a host such as host 101. Hardware resources managed by application OS 12 can include, for example, the network interface 126, solid-state memory 128, disk 150, memory 140, and one or more processors in SoC 120 (e.g., processor 210 shown in FIG. 2). Software resources managed by application OS 12 can include, for example, file system(s) 14, driver(s) 21, or application(s) 22.

File system(s) 14 can include one or more file systems for accessing or organizing files stored in the NVM of storage device 106. By executing a file system on storage device 106, it is ordinarily possible to tailor the file system to a particular storage media used by storage device 106 to store data. In one example, file system(s) 14 can include a file system that may be well suited to sequentially writing data on SMR media, such as Linear Tape File System ("LTFS") or a log-structured file system like New Implementation of a Log-structured File System ("NILFS"). Other file systems of file system(s) 14 can include, for example, B-tree file system ("BTFS"), ext2, ext3, ext4, or XFS.

Figure 2:
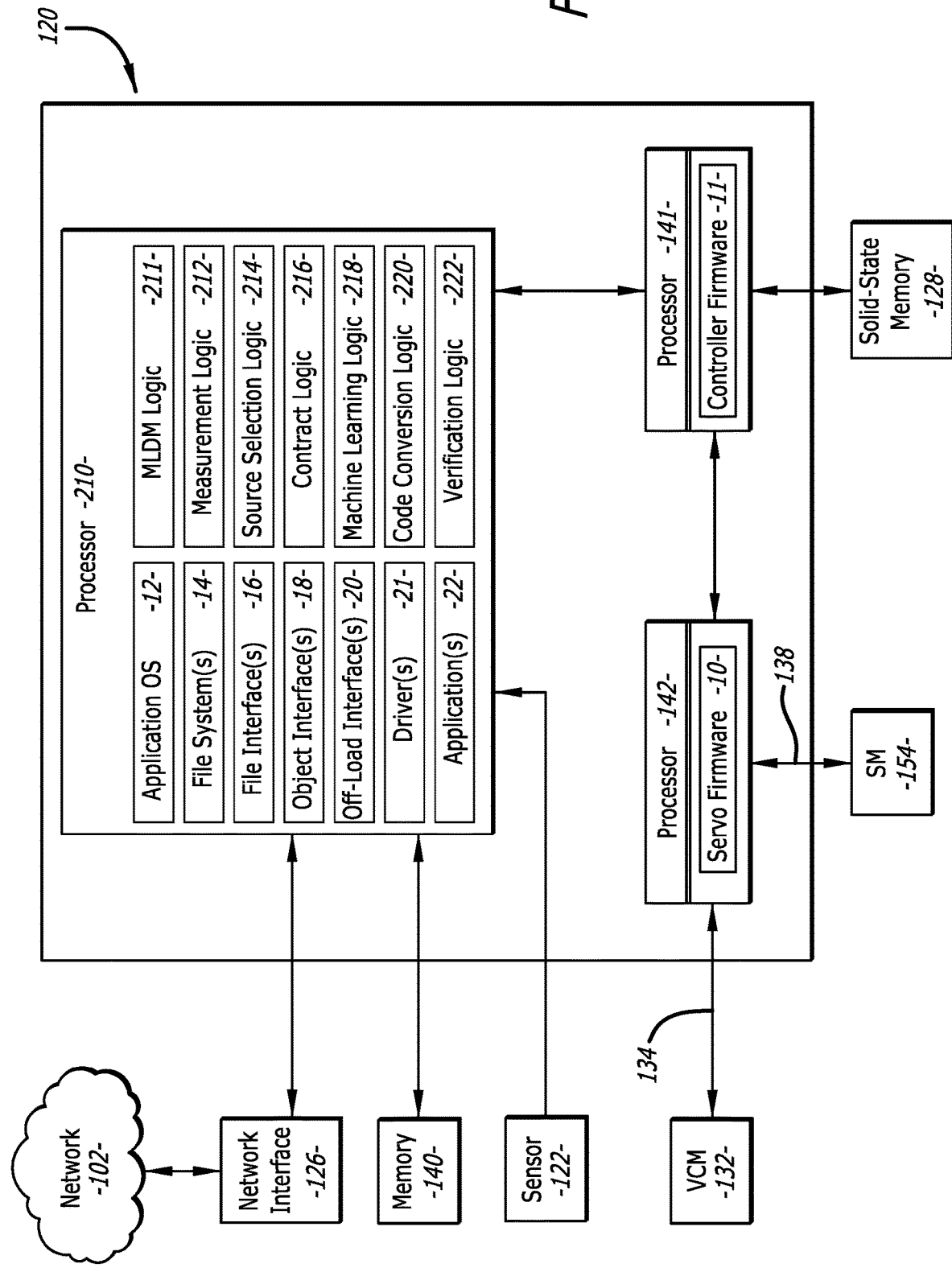
FIG. 2 is a block diagram of a System on a Chip (SoC) of a storage device in accordance with an embodiment of the invention.

Driver(s) 21 can include software for interfacing with firmware or other software of the storage device 106 (e.g., controller firmware 11 or servo firmware 10 as shown in FIG. 2, or firmware of network interface 126) and can execute in a kernel space of application OS 12. Driver(s) 21 can also allow for interfacing with other devices on network 102, such as storage device 107.

Application(s) 22 can include applications developed by a manufacturer of the storage device 106 and/or independently developed applications that have been downloaded from network 102. For example, the storage device 106 may receive computer executable instructions from host 101 via the network interface 126 and then execute the computer-executable instructions to create an application 22. In some implementations, a Software Development Kit (SDK) could be made available to allow customer and/or vendors on network 102 to develop their own applications to run on storage device 106.

Application(s) 22 or driver(s) 21 can include data storage-related applications such as a user interface for operating storage device 106, storage device health monitoring for monitoring the reliability of storage device 106, and/or migrating data to another storage device or NVM within storage device 106 before losing data, data encryption, data compression, erasure coding or error correction, directing data for storage on disk 150 or solid-state memory 128 based on attributes of the data (e.g., tiered storage), deduplication of data stored in storage device 106, or mirroring data (e.g., data backup).

In addition, application(s) 22 or driver(s) 21 can customize the storage device 106 for specific uses such as working with sensor data, streaming certain types of media over network 102, configuring storage device 106 to operate as a DVR or media server, managing the synching or backup of computing devices, providing a Bluetooth connection, a Wi-Fi hotspot, or configuring the storage device 106 to operate as a Network-Attached Storage (NAS). In one embodiment, an application 22 can allow a processor of the storage device 106 (e.g., processor 210 of SoC 120 shown in FIG. 2) to monitor at least one indicator of the reliability of another storage device on network 102 (e.g., storage device 107) for storing data with the use of network interface 126. An indicator of reliability could include, for example, a number of errors in retrieving or storing data on the other storage device or an amount of use of a particular NVM of the other storage device, such as a number of Program/Erase (P/E) cycles for a flash memory of the other storage device. In some cases, application 22 may also cause a processor of storage device 106 to copy data from another storage device to an NVM of storage device 106 if one or more indicators of reliability for the other storage device reach an unsafe or undesirable threshold.

In another implementation, application 22 can cause a processor of the storage device 106 to receive an input from the sensor 122 indicating an environmental condition of storage device 106 such as a vibration condition, an air pressure condition, a humidity condition, or a temperature condition. The processor can then determine whether the input exceeds an unsafe or undesirable threshold. If the input exceeds the threshold, the processor can redirect at least one command to store data in the NVM of storage device 106 to another storage device on network 102 (e.g., storage device 107). The processor may also request environmental condition information from other storage devices on network 102 to identify another storage device to receive one or more redirected commands. In addition, the processor may stop redirecting commands if a subsequent input from sensor 122 indicates that the subsequent input has fallen below a threshold, thereby indicating that it is safe to store data in an NVM of storage device 106.

Data included in mapping 24, write pointers 26, command queue 28, buffer 30, or data to be stored in or retrieved from NVM can also be stored in memory 140 so that the data can be accessed by a processor of storage device 106 (e.g., processor 210 shown in FIG. 2) during the execution of software programs to the extent that such software programs have a need to access and/or modify the data. In addition to shifting processing from host 101 to storage device 106 with offload interface(s) 20 (shown in FIG. 2), running application OS 12 at storage device 106 can allow for shifting tasks to file system(s) 14, driver(s) 21, and/or application(s) 22 that may otherwise have been performed by firmware (e.g., controller firmware 11 shown in FIG. 2) of storage device 106. In addition to the tasks mentioned above of data encryption, data compression, erasure coding or other error correction, the direction of data for storage on disk 150 or solid-state memory 128, deduplication of data, and data mirroring, a processor of storage device 106 (e.g., processor 210 shown in FIG. 2) executing file system(s) 14, driver(s) 21, or application(s) 22 can use mapping 24, write pointers 26, command queue 28, and buffer 30 to perform other tasks related to the management of storage media in storage device 106. By moving one or more such tasks from the firmware of storage device 106 to a file system 14, application 22, or driver 21 executed on a processor of storage device 106, the tasks can be more easily modified in the field, and the firmware of storage device 106 can be simplified.

In various embodiments, mapping 24 can map logical addresses (e.g., Logical Block Addresses ("LBAs")) for data to physical addresses (e.g., block addresses) corresponding to locations in the NVM of storage device 106 that store the data. This can allow for a processor executing application OS 12 to direct data to a particular NVM (e.g., disk 150 or solid-state memory 128) or particular zones within an NVM based on attributes of the data. Mapping 24 may also be stored in an NVM of storage device 106, such as disk 150 or solid-state memory 128, so that mapping 24 is available after storage device 106 has been powered off. Alternatively, memory 140 may be an NVM such as MRAM.

Write pointers 26 can be used by a processor executing application OS 12 to keep track of a location for performing the next write in a sequentially written zone, such as an SMR zone on disk 150. Write pointers 26 may also be stored in an NVM of storage device 106, such as disk 150 or solid-state memory 128, so that write pointers 26 are available after storage device 106 has been powered off.

Buffer 30 may be used by a processor executing application OS 12 in performing various operations including, but not limited to, Read-Modify-Write ("RMW") operations on disk 150, such as garbage collection to reclaim portions of disk 150 storing invalid or obsolete data. In these operations, the processor may read a zone of tracks and store the valid data from the zone in buffer 30 before rewriting the valid data on disk 150. In addition, the processor may identify or prioritize a particular zone for garbage collection by determining a level of invalid or obsolete data stored in the zone and/or a frequency of use of the zone.

Training data 32 may be used by logics and/or software in order to facilitate generation of one or more machine learning models. Training data 32 may include, but is not limited to, weights, connection data, and historical results of previous machine learning model outputs. In some embodiments, training data 32 may be generated and installed on the storage device during the manufacturing process and remain static. In additional embodiments, training data 32 can be dynamically generated and utilized in the updating of existing or creation of new machine learning models.

Threshold(s) 34 can include values, ranges, or other data that can be used in a verification process. As shown in more detail below with respect to the discussion of FIG. 9, each output of a machine learning model can be verified prior to utilization within the storage device. Threshold(s) 34 can be utilized in the verification process to compare against the output data (i.e., inference(s) 42) generated by the machine learning models. The storage device may be configured to utilize multiple threshold(s) 34 either together in a single evaluation or in a series of successive verification steps. Threshold(s) 34 may also be statically set during manufacture and/or dynamically created and adjusted based on newly received data.

Model(s) 36 refer to one or more machine learning-based model(s) 36 that can generate inference data in response to receiving an input vector(s) 40 to process. As discussed in more detail below, machine learning model(s) 36 may be installed during the manufacture of the storage device or be included within a software or firmware update process. In certain embodiments, new model(s) 36 may be dynamically generated and/or adjusted based on newly processed or received data. For example, a model 36 may be generated to evaluate a property on each head within the hard-disk memory. However, the number of sectors or heads to evaluate within model 36 may decrease due to bad sectors accumulating over time. In these cases, each model(s) 36 may need to be adjusted to account for these changes in items to evaluate with the model(s) 36.

Log(s) 38 are data stores that are comprised of data pieces that reflect how one or more operations within the storage device have occurred. As those skilled in the art will recognize, virtually any type or variety of log(s) 38 may be stored within a memory of the storage device. Log(s) 38 may be stored as a text-based file format, but there is no direct limitation to the type of data format that may incorporate log(s) 38 for the purposes of generating inference(s) 42 based on that data.

Input Vector(s) 40 are data structures that are specifically formatted to deliver data into one or more input nodes within a machine learning model(s) 36. As discussed in more detail below, each model 36 may vary in size, complexity, and types of input desired and output produced. The storage device may often evaluate a machine learning based model 36 and determine a suitable way to pass data into it in order to facilitate a productive output (i.e., inference(s) 42). Input vector(s) 40 are often generated from and associated with contract data which tracks not just the input vector(s) 40 but also the output format as well.

Inference(s) 42 are a term for the generalized outputs of machine learning model(s) 36. As highlighted within the discussions of FIGS. 4 through 6, inferences can be generated in lieu of utilizing a traditional measurement or other data request. For example, a series of steps to complete a process may be broken down such that a plurality of steps may be skipped over as the necessary input data needed can be sufficiently generated from the inference(s) 42. In many embodiments, the inference(s) 42 may be directly passed to the process that requested the data or given to a subsequent step in the process to increase overall storage system efficiencies.

If access to the disk is needed, SoC 120 can control VCM 132 with VCM control signal 134. In this regard, SoC 120 may control SM 154 via SM control signal 138 to rotate the disk. SoC 120 can also control VCM 132 via a VCM control signal 134 to position a head 136 over the disk. SoC 120 may provide write data to head 136 or receive read data from head 136 via Read/Write Signal 137.

Referring now to FIG. 2, a block diagram of a System on a Chip (SoC) 120 of a storage device in accordance with an embodiment of the invention is shown. The SoC 120 may include processors 210, 141, and 142. In other embodiments, one or more of processors 210, 141, and 142 may be located on different chips such that not all of processors 210, 141, and 142 are located within SoC 120. Additionally, processors 141 and 142 may be combined into one processor, or processors 141 and/or 142 may serve as co-processors of processor 210 in other embodiments.

In a number of embodiments, each of processors 210, 141, and 142 is a processor core such as, but not limited to, an ARM M3 processor. In additional embodiments, processor 210 can include an ARM A5 or A6 processor, while processors 141 and 142 can be ARM M3 processors. In yet further embodiments, different types of processors, such as those based on a RISC-V ISA, can be used. In other embodiments, any appropriate processor(s) may be used for the various functions and logics internal to SoC 120.

As shown in the embodiment depicted in FIG. 2, processor 210 can execute application OS 12, file system(s) 14, file interface(s) 16, object interface(s) 18, offload interface(s) 20, driver(s) 21, and application(s) 22. Processor 210 can interface with memory 140 in executing such software and can further interface with the network interface 126 in communicating via network 102 when needed.

In many embodiments, the processor 210 may additionally operate and/or execute one or more logics that are utilized to facilitate machine learning within the SoC 120. As shown in the embodiment of FIG. 2, these logics can include a Machine Learning Defect Management (MLDM) logic 211, a measurement logic 212, source selection logic 214, contract logic 216, machine learning logic 218, code conversion logic 220, and/or verification logic 222. Each of these logics will be discussed in more detail below and can access data stored within memory 140. As those skilled in the art will recognize, each of the logics 211, 212, 214, 216, 218, 220, and 222 may be implemented as software applications that are loaded or otherwise derived from the application(s) 22. Such skilled persons will also recognize that the logics 211, 212, 214, 216, 218, 220, and 222 may also function as control circuits implemented in hardware, software, or a combination thereof.

As discussed above, having an application OS 12 embedded or running on the storage device 106 can provide several advantages over conventional storage devices that do not locally execute an embedded application OS. Such advantages include the ability to support TCP/IP over Ethernet or Wi-Fi interfaces (e.g., via the network interface 126), the ability to embed a file system (e.g., file system(s) 14) that may be better adapted to a particular storage media of storage device 106, and to allow for new applications and/or logics (e.g., application(s) 22) to be developed for different uses of storage device 106. As will be appreciated by those of ordinary skill in the art, one or both of processors 141 and 142 may run a Real-Time Operating System ("RTOS") that is intended to perform real-time processes for components such as, but not limited to, servo firmware 10 and/or controller firmware 11. In contrast, processor 210 can run application OS 12 which allows for the execution of software as discussed in more detail below.

In storing or retrieving data from the NVM of a storage device 106, processor 210 can execute application OS 12 to interface with processor 141, which executes controller firmware 11. Controller firmware 11 can then control the operation of the NVM of storage device 106 and may be stored in a dedicated memory of the SoC 120 (e.g., a flash memory not shown) or may be stored on another NVM of the storage device 106, such as the disk or solid-state memory 128.

As noted above, the use of an application OS at processor 210 can allow for a simplified firmware of storage device 106. In more detail, many of the tasks conventionally performed by executing storage device firmware may be shifted to software executed by the processor 210. As a result, controller firmware 11 in some implementations may primarily serve only to store or retrieve data in NVM, with many of the maintenance operations for the NVM being performed by file system(s) 14, driver(s) 21, and/or application(s) 22. Tasks that may be shifted to processor 210 can include, for example, data encryption, data compression, erasure coding or other error correction, data deduplication, data mirroring, the direction of data for storage on disk or solid-state memory 128 based on attributes of the data, the direction of data for storage in a CMR zone (i.e., a zone of non-overlapping tracks) or an SMR zone (i.e., a zone of overlapping tracks) of a disk based on attributes of the data, address mapping, maintenance of write pointers, ordering of command queues, garbage collection, and/or other storage device optimizations.

In many embodiments, processor 210 can execute an application OS 12 to interface with processor 141 and send a command to processor 141 to retrieve data from or store data in the disk or solid-state memory 128. The interface between processor 210 and processor 141 can be object-based, use a standard such as SAS or SATA, or be a custom interface. In the case of an object-based interface, processor 210 can use the application OS 12 to execute an object interface 18 to send a command to retrieve, store, or delete particular data objects stored in the disk or solid-state memory 128. In the case of using a standard such as SAS or SATA, the processor 210 can use a file system 14, a file interface 16, or a driver 21 to send read, write, or trim commands for particular LBAs associated with the data. In the case of a custom interface, a manufacturer may provide a customized file system 14 or a driver 21 to send commands to processor 141.

If access to the disk is needed, processor 141 can communicate with processor 142, which may execute servo firmware 10. In this regard, processor 142 controls SM 154 via an SM control signal 138 to rotate the disk. Processor 142 can also control VCM 132 via a VCM control signal 134 to position a head over the disk.

Machine Learning Defect Management (MLDM) logic 211 can be a series of circuits, software, and/or operations that can utilize machine learning to manage defects detected on the surface of disk 150. Defects like, for example, scratches, thermal expansion, and/or delamination can occur during the manufacturing process or develop over time when storage device 106 is installed in the field. This will be described in detail below in conjunction with FIGS. 10A through 13C. Persons skilled in the art will realize that the MLDM may be operated as software on processor 210, in hardware or software elsewhere within SoC 120, or external to storage device 106 like, for example, on host 101, on external disk drive tester used in manufacturing the hard disk, on an external host, or on an external data storage system with many disk drives, etc. Various machine learning techniques such as convolutional neural networks, feed-forward convolutional networks, or long short-term memory networks may be used.

Measurement logic 212 can be a series of circuits, software, and/or operations that can gather one or more measurements within the storage device. Measurements can include properties of the storage device, a memory within the storage device, and/or any external properties such as environmental factors. In many embodiments, measurement logic 212 can gather and process these measurements via non-machine learning-based methods. However, as discussed in more detail above, the determination of measurements via the measurement logic may be too computationally intensive, take too much time, and/or would be requesting resources that are not available.

In certain embodiments, source selection logic 214 can evaluate a request for measurements or other data and determine if generating one or more inferences via machine learning models is suitable. In this way, source selection logic 214 can change the destination paths of data requests which may allow for the potential increase in efficiency by incorporating one or more machine learning models. Source selection logic 214 can be configured to utilize historical data and/or projected computational costs when determining if utilizing machine learning models is appropriate.

Contract logic 216 can be configured to determine and generate proper data inputs and outputs of a machine learning model. As discussed in more detail below, each machine learning model can be uniquely configured to receive a particular type of input data and associated output format. For example, a machine learning model may be constructed to receive two numerical inputs and two alphanumeric inputs which are then processed to receive a single numerical value. In many embodiments, contract logic 216 can facilitate the steps necessary for the storage device to acquire the two numeric inputs from a first location within log(s) 38 while retrieving the two alphanumeric inputs from a second location within logs (38). The same contract logic 216 can provide facilitate processing and/or passing the generated inference output data to a proper location within the storage device. In this way, contract logic 216 can generate a specific contract associated with, and often paired with, each individual machine learning model.

In a number of embodiments, machine learning logic 218 can encompass all operations necessary to facilitate machine learning within a storage device. In certain embodiments, the nature of machine learning logic 218 scope may be limited to simply providing and administering machine learning models that interact with other, separate logics. Machine learning logic 218 can, in some embodiments, facilitate the communication between the various logics within the storage device. In other embodiments, machine learning logic 218 can be external to the disk drive like, for example, in an external disk drive tester used in manufacturing the disk drive, on an external host like host 101, or in an external storage device or system (and/or subsystem) with other disk drives.

For example, in one embodiment, machine learning logic 218 may access one or machine learning models stored within memory and summarize and/or otherwise provide these model(s) to the source selection logic 214 which may determine if one or more of the model(s) would be suitable for execution instead of traditional measurements or processing. Upon selection, machine learning logic 218 can then facilitate contract logic 216 to facilitate assembly of an input vector which can then be passed into the machine learning model for processing. Upon completion of processing, the generated inference output data can then be passed back to the requesting application.

In some embodiments, prior to execution within the storage device, the various machine learning models, associated contracts, and other related data may be converted from their various formats into machine-executable source code. In various embodiments, this conversion can be facilitated by code conversion logic 220. A storage device may be configured to accept a plurality of different file formats that represent machine learning models which may be subsequently converted into embedded source code. The code conversion logic 220 can, in various embodiments, be a compiler that generates one or more source code files from various input file formats.

Although many embodiments discussed herein utilize machine learning models to increase overall storage device processing efficiency, novel instances and input variables can potentially provide undesirable or otherwise unusable inference output data. Recognizing this, some embodiments can utilize verification logic 222 which may evaluate the generated inference output data before it is utilized by the storage device. Verification processing is discussed in more detail in FIGS. 4 and 9.

Verification logic 222 can access one or more thresholds stored in memory and then compare the generated inference output data against these thresholds. The comparisons may be a simple numerical difference analysis but may involve more complex, multi-dimensional analysis depending on the type of inference data generated by the machine learning model. The thresholds used for comparison can be static values stored in memory that were added during the manufacturing process. In further embodiments, thresholds may be dynamically generated, such as, for example, in response to gathered historical data or other previously verified results.

When inference data fails to be verified (such as when the value exceeds a threshold), verification logic 222 may send a signal to measurement logic 212 to perform a non-machine learning-based measurement or other traditional data generation/retrieval. The results of the verification failure (including the rejected value(s)) may then be stored within one or more logs within the storage device. In this way, the storage device can avoid utilizing faulty values generated by machine learning models.

Figure 3:
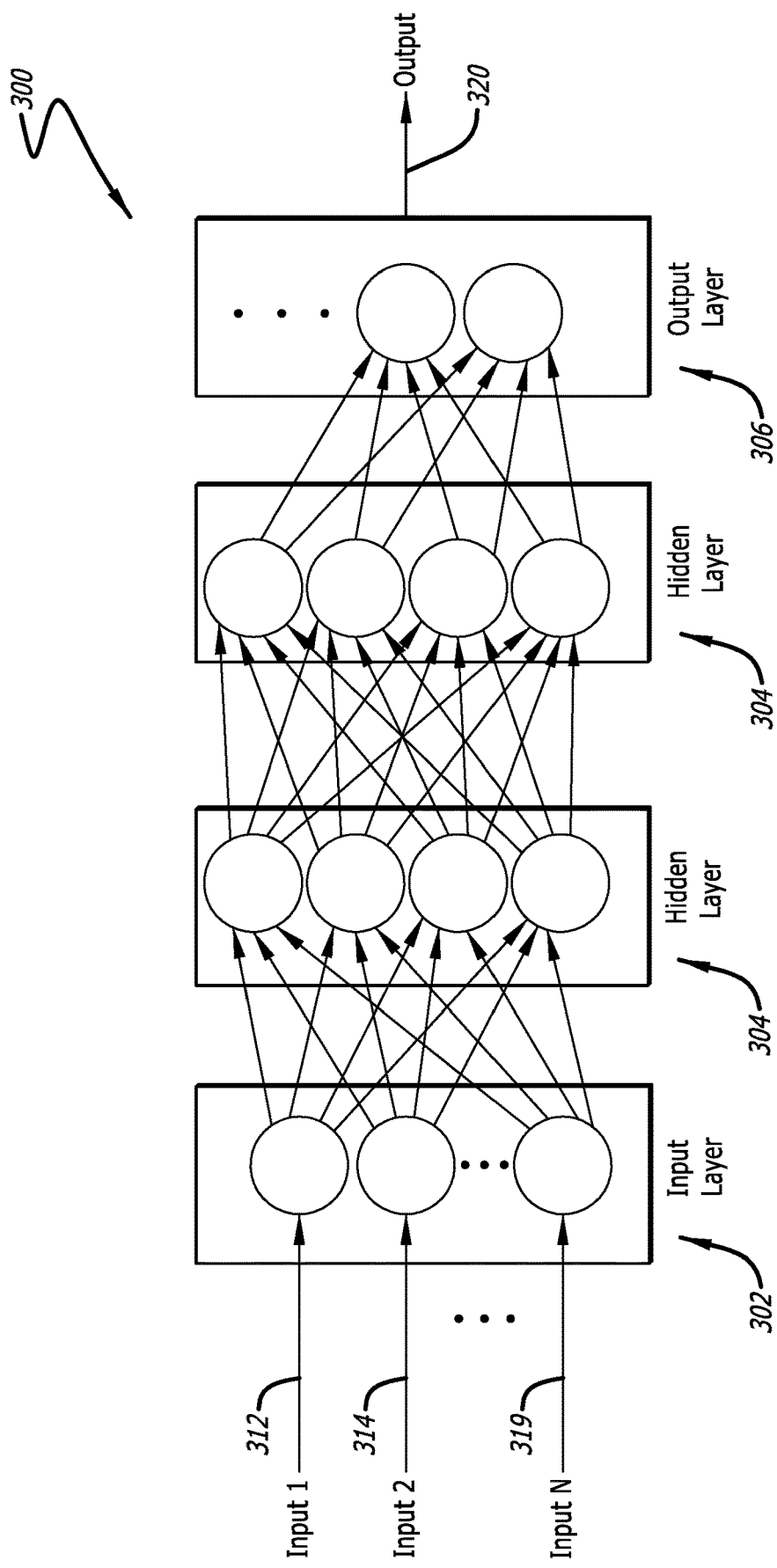
FIG. 3 is a conceptual illustration of a neural network utilized in machine learning models in accordance with an embodiment of the invention.

Referring to FIG. 3, a conceptual illustration of a neural network 300 utilized in machine learning models in accordance with an embodiment of the invention is shown. As discussed above, neural networks can be utilized within machine learning algorithms in order to generate an inference as output from a specified set of inputs 312, 314, and 319. The neural network depicted in FIG. 3 is a simplified example intended to illustrate the general concept that may be utilized in various embodiments with more complexity. At a high level, the neural network 300 comprises an input layer 302, a plurality of hidden layers 304, and an output layer 306. The neural network 300 comprises a collection of connected units or nodes, typically called artificial neurons, which often loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. The result of what output to generate at each node is usually associated with the strength and number of signals/inputs 312, 314, 319 received, as well as the general weighting of each signal internally within the node.

In a typical embodiment, the signal at a connection between artificial neurons is a real number, and the output of each artificial neuron is computed by some non-linear function (called an activation function) of the sum of the artificial neuron's inputs. The connections between artificial neurons are often called "edges" or "axons." As mentioned above, artificial neurons and edges typically have a weight that adjusts as learning proceeds. The weight can increase or decrease the strength of the signal at a connection. Artificial neurons may have a threshold (trigger threshold) such that the signal is only sent if the aggregate signal crosses that threshold. Typically, artificial neurons are aggregated into layers, as shown in FIG. 3. Different layers may perform different kinds of transformations on their inputs. Signals can propagate from the first layer (the input layer 302) to the last layer (the output layer 306), possibly after traversing one or more intermediate layers, called hidden layers 304.

The inputs 312, 314, and 319 to a neural network may vary depending on the problem being addressed. In the embodiment depicted in FIG. 3, the input layer 302 comprises a first input (i.e., Input 1) 312, a second input (i.e., Input 2) 314 up to a final input (i.e., Input N) 319. In a drive optimization measurement, for example, the inputs may be values associated with each head or zone within the storage device disk. In one embodiment, the neural network 300 may comprise a series of hidden layers 304 in which each neuron is fully connected to neurons of the next layer. The neural network 300 can utilize an activation function such as a sigmoid or a rectified linear unit ("ReLU"), for example. The last layer in the neural network may implement a regression function to produce a classification or other inference as output data 320.

In certain embodiments, the neural network 300 is trained prior to deployment into the field. However, some embodiments may utilize ongoing training of the neural network 300, especially when operational resource constraints are less critical. As will be discussed in more detail below, the neural networks in many embodiments can be generated as one or more models that can be converted into embedded code which may be executed to generate various inferences within the storage device. An overview of this process is described in more detail in FIG. 4.

Figure 4:
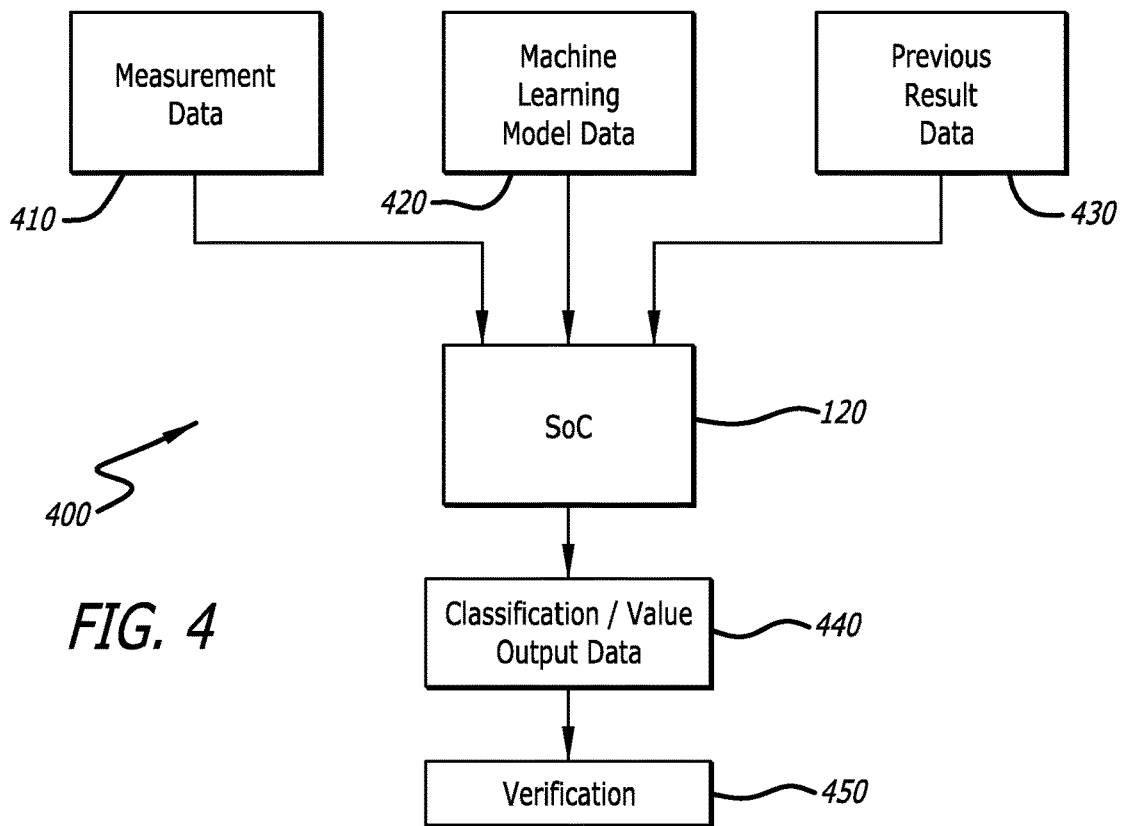
FIG. 4 is a high-level conceptual flowchart depicting the utilization of machine learning within a storage device in accordance with an embodiment of the invention.

Referring to FIG. 4, a high-level conceptual flowchart 400 depicting the utilization of machine learning within a storage device in accordance with an embodiment of the invention is shown. Broadly, the process 400 of utilizing machine learning within existing storage devices can be described by the SoC 120 receiving a plurality of inputs such as, but not limited to, measurement data 410, machine learning model data 420, and previous results data 430. These input data 410, 420, and 430 can be utilized by the SoC 120 to generate a plurality of classification and/or value output data 440.

As discussed above, the classification and/or value of output data 440 can be understood as an inference relating to a particular measurement, generalization, or other aspects of the storage device. By way of example and not limitation, the SoC 120 may run software that is organized and compiled based on the received data 410, 420, and 430 in response to receiving or generating a request for a particular drive-related measurement. In certain embodiments, the computational resources and/or time needed to generate, compile, and process machine learning models to respond with an estimated value or inference can be less than the computational resources and/or time needed to perform the actual measurement. In these instances, the ability to generate machine learning-based inferences is a more efficient response for the storage device.

In a number of embodiments, the classification and/or value output data 440 can be verified through one or more verification processes 450. Verification 450 can occur for each generated inference or during an initial setup or weighting process when a new machine learning model is being utilized. In certain embodiments, the verification 450 can access one or more preconfigured thresholds associated with a range of values that may be expected from the machine learning-based classification and/or value output data 440. When the generated inference exceeds a preconfigured threshold, the verification 450 can prevent the use of the inference and request that a non-machine learning method be used to make the requested measurement and/or data generation. Verification 450 is described in more detail in the discussion of FIG. 9.

Figure 5:
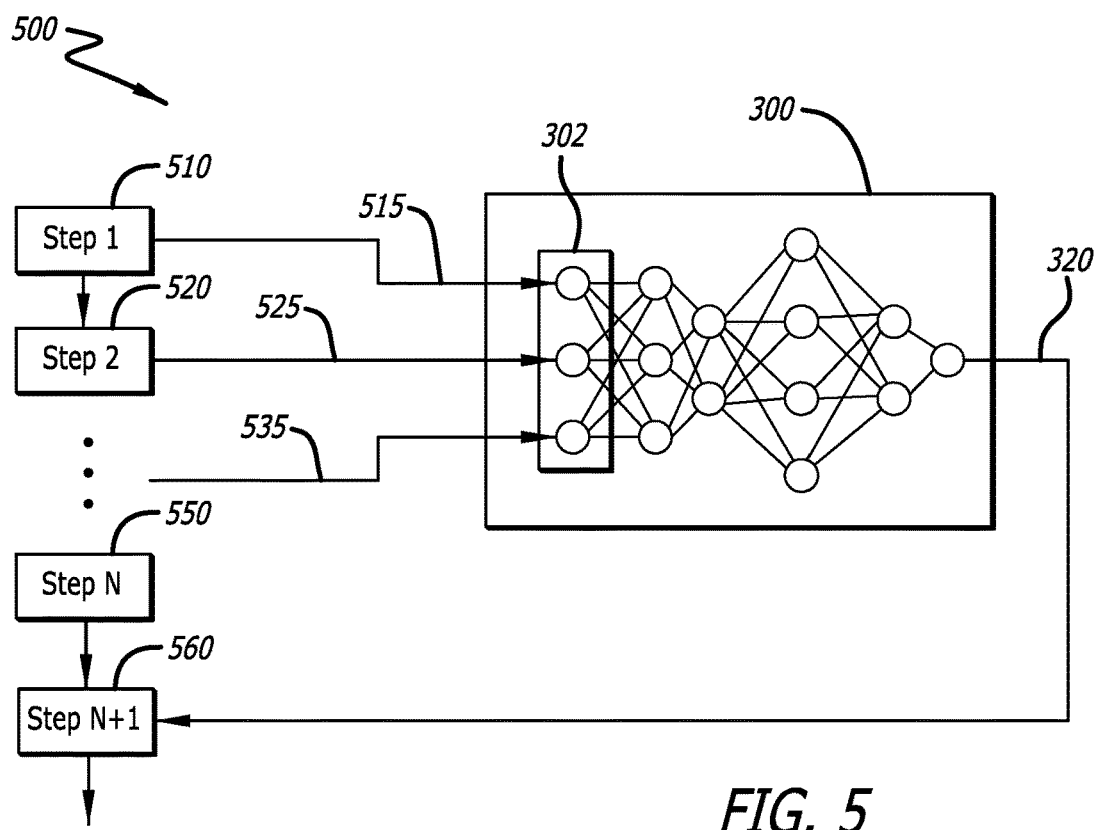
FIG. 5 is a conceptual flowchart depicting a process for replacing a plurality of steps of a process within a storage device with machine learning processing in accordance with embodiments of the invention.

Referring to FIG. 5, a conceptual flowchart depicting a process 500 for replacing a plurality of steps of a process within a storage device with machine learning processing in accordance with embodiments of the invention is shown. Software operating on the SoC can attempt to complete a wide variety of processes which may include one or more steps. Therefore, it is contemplated in many embodiments that during normal operations of various process 500, that one or more steps may be replaced by machine learning-based equivalents.

As conceptually shown in the embodiment of FIG. 5, process 500 begins with Step 1 510, which proceeds to Step 2 520 onward until a final Step N+1 560. Steps 1 to N (510 to 550) are configured to retrieve and/or generate an output value that can be returned by the final step N+1 560 as output. In lieu of executing particular steps within the process 500, a neural network (i.e., machine learning model) 300 may be utilized to generate inference output data 320 that can be used by the final step N+1 560 to provide an output/response. In this way, a plurality of intermediate steps 510 and 520 can be skipped and/or utilized as input signals 515, 525, and 535 for the input layer 302 of the neural network 300. Various embodiments can then utilize the inference output data 320 as input into Step N+1 560 instead of executing step N 550. Thus, for embodiments where execution of step N 550 is more computationally intensive than generating inference output data 320 from a machine learning model or neural network 300, process 500 allows the storage device to operate more efficiently.

As those skilled in the art will appreciate, the specific structure and number of steps within a process can vary depending on the complexity of the process. Additionally, the number of steps utilized as input for the machine learning model can vary based on the intricacy of the inference to be generated. It is also contemplated that the representation of process 500 depicted in FIG. 5 is conceptual in nature and can be processed and configured to be represented as embedded source code that is executed by one or more processors within the storage device, such as an SoC.

Figure 6:
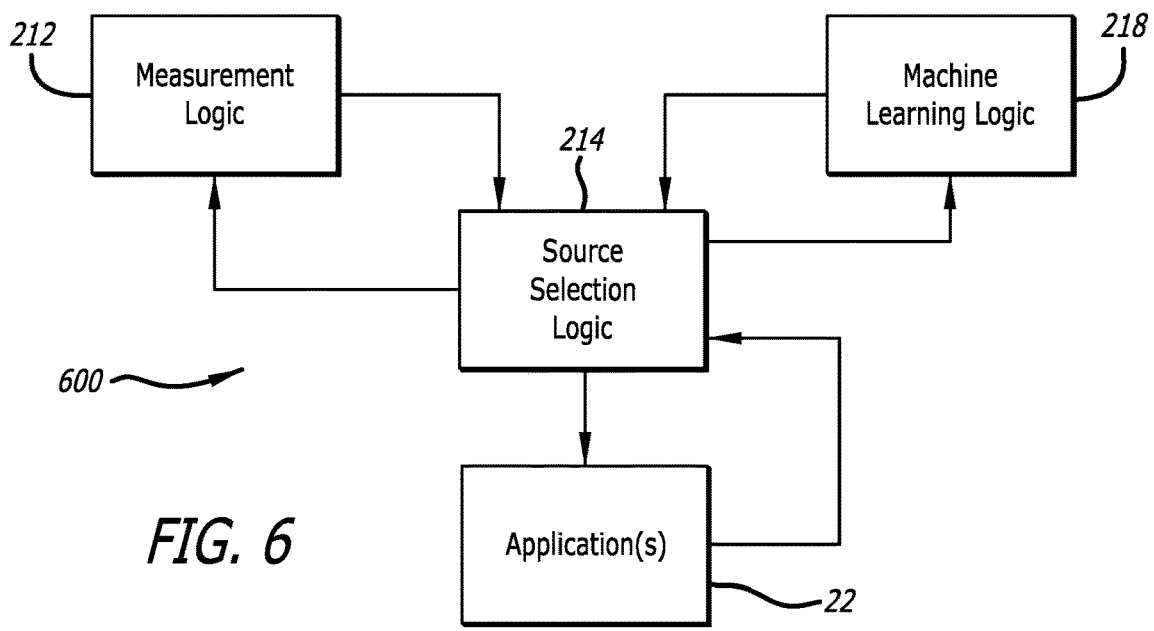
FIG. 6 is a conceptual flowchart depicting a process for selecting machine learning processing in response to a measurement request in accordance with embodiments of the invention.

Referring to FIG. 6, a conceptual flowchart depicting a process 600 for selecting machine learning processing in response to a measurement request in accordance with embodiments of the invention is shown. As discussed above, one or more applications 22 may be processed within an SoC of a storage device. As part of the execution process, the application(s) 22 may require one or more measurements to occur within the storage device. Particular measurements may be computationally intensive, require an excessive amount of time to process, and/or require more resources that may currently be available.

During normal operation, application(s) 22 can send a request for a measurement. In many embodiments, the storage device can be configured with a source selection logic 214 that can intercept or otherwise read the measurement request data and/or signal. In response to known measurement requests, the source selection logic 214 can direct the storage device to select between taking a traditional measurement (via a measurement logic 212) or generating a machine learning-based inference to simulate a traditional measurement (via a machine learning logic 218).

When the source selection logic 214 determines that generating a machine learning-based inference, an activation signal can be transmitted to the machine learning logic 218. As discussed in more detail above, in response to receiving the activation signal, the machine learning logic 218 can determine a specific machine learning model that can be utilized, generate a contract associated with that model, process the model with the contract, and generate an inference that can be passed back to the application(s) 22. In a number of embodiments, the inference generated by the machine learning logic 218 can be verified for corresponding to a certain range before being returned to the application(s) 22. In response to the generated inference being outside of an acceptable range or otherwise failing a verification process, the source selection logic 214 can send the initial measurement request to the measurement logic 212 to initiate a traditional measurement.

Although the embodiment depicted in FIG. 6 is shown with the inference and measurement responses sent through the source selection logic 214 before being routed back to the application(s) 22, it is contemplated that measurements and/or inferences can be directly routed to the application(s) 22 or to any other logic within the storage device as needed. In further embodiments, other types of data may be requested by the application(s) 22 besides measurements. Although the embodiment described within FIG. 6 describes processes for selecting between various measurement requests, any external data that may be requested by application(s) 22 can be evaluated by the source selection logic 214 for potential inference generation by the machine learning logic 218.

Figure 7:
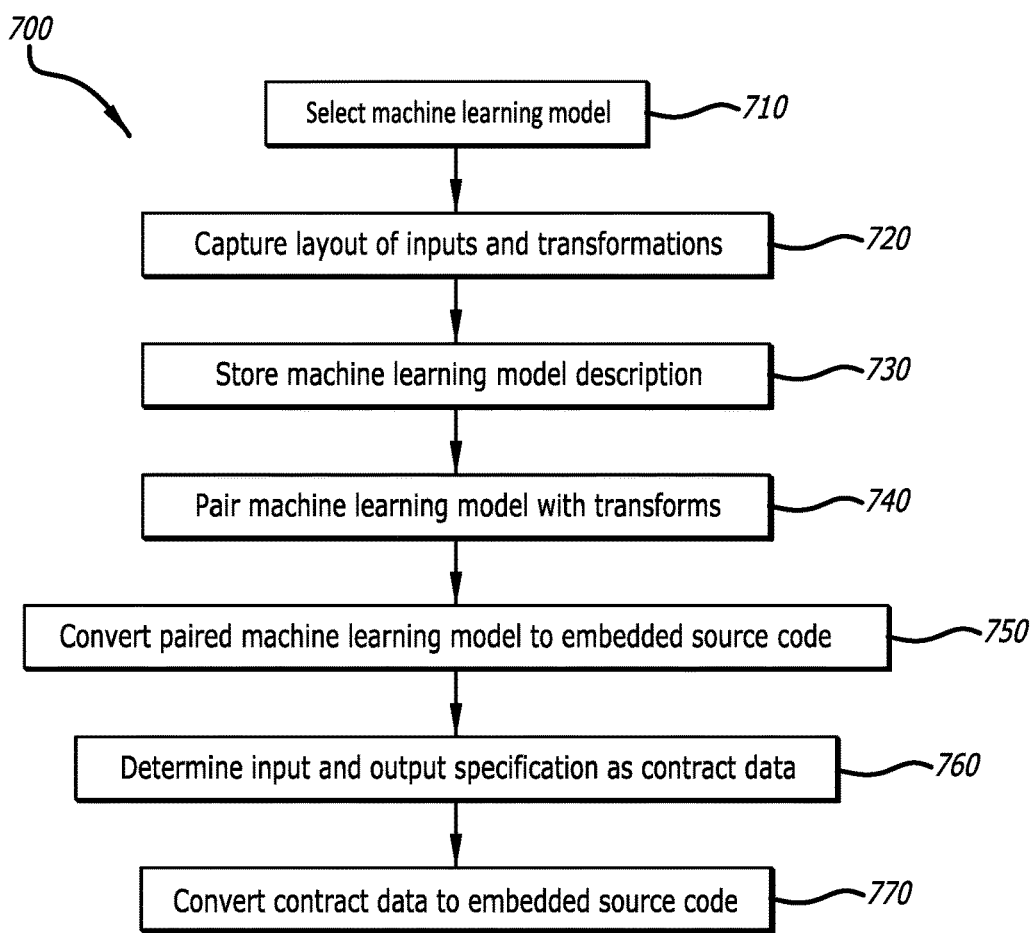
FIG. 7 is a conceptual flowchart depicting a process for generating embedded source code for machine learning processing in accordance with embodiments of the invention.

Referring to FIG. 7, a conceptual flowchart depicting a process 700 for generating embedded source code for machine learning processing in accordance with embodiments of the invention is shown. In many embodiments, the utilization of various machine learning models to generate an inference is accomplished by selecting a specific model and converting it (and an associated contract) to embedded machine readable code that can be executed within the SoC of the storage device. Process 700 typically initializes when a machine learning model is selected for use (block 710).

A selected machine learning model may comprise a plurality of inputs and transformations that can be arranged in a particular layout. Typically, the machine learning model is trained from historical data which can include previously generated inferences or other measurements and/or data. In additional embodiments, the training of the model can be configured during the manufacturing process for continual retraining of the model during use. In further embodiments, the weights of a model may be set prior to the manufacturing process and remain static. In alternative embodiments, model weights may be configured shortly after the manufacture of the storage device and correspond to device-specific characteristics of each individual storage device.

Process 700 can be configured to capture this layout of inputs and associated transformations (block 720). This capture can be further stored as a machine learning model description (block 730). In a number of embodiments, the machine learning model description can be a computational graph of the model. However, it is contemplated that any compatible representation of the machine learning model may be utilized prior to conversion to embedded source code. Process 700 may also pair machine learning models with the associated transforms (block 740). Transforms can be processed separately from the machine learning models in various embodiments, as multiple models may utilize the same transforms. Thus, by utilizing associations between the machine learning models and transforms, required storage space can be reduced, and transforms and/or models can be updated independently as needed in response to more efficient or accurate models and/or transforms.

Upon pairing, a machine learning model and transforms can be converted to embedded source code that can be executed within the SoC of the storage device at runtime (block 750). In various embodiments, the conversion will generate at least one C++ and header file format pair. However, it is contemplated that any machine-readable format may be generated during the conversion process.

Each machine learning model will have at least a plurality of inputs and outputs. The number, types, and configurations of the inputs and outputs can vary based on the type of processing done and inference generated by the machine learning model. Therefore, the storage device typically requires a configuration in order to properly deliver the necessary input data to generate an inference within the model. Likewise, the size, type, and format of the generated inference output should be stored within a configuration in order to facilitate proper delivery and processing of the output.

This configuration of input and output formats can be understood as a "contract." The contract can be a file or other data structure that can indicate which data should be captured, read, or otherwise acquired as input within the storage device and fed into the input of the machine learning model as well as the specification of the output of the model that can be utilized as an inference within the storage device. Process 700 can examine the machine learning model to be utilized and determine the input and output specification as contract data (block 760). In response to receiving contract data, a conversion can occur to generate additional embedded source code associated with the contact data (block 770). Once the embedded source code has been generated, a storage device can utilize the source code to generate and utilize output data from the machine learning model, generally as an inference. This process is described in more detail below.

Figure 8:
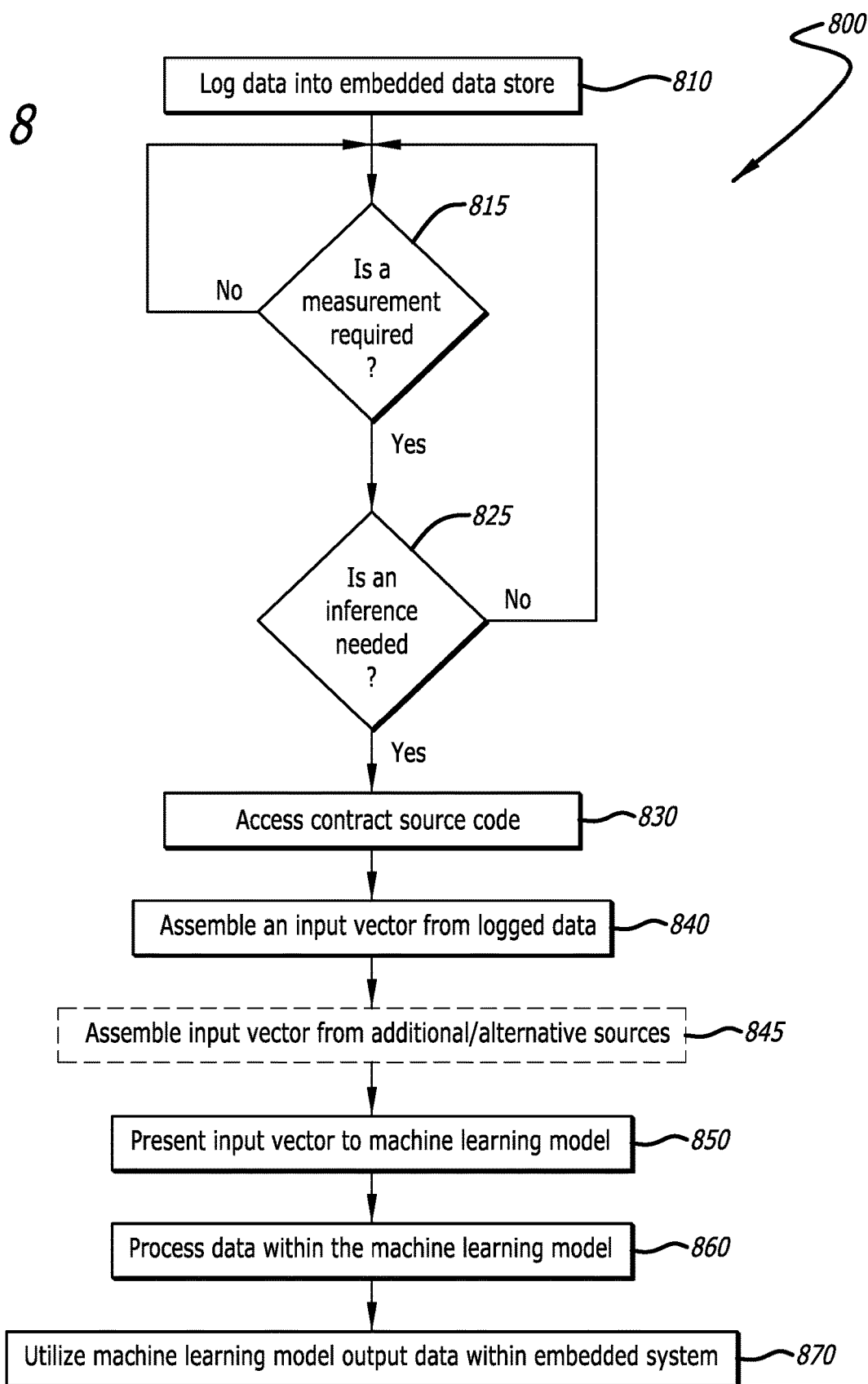
FIG. 8 is a conceptual flowchart depicting a process for utilizing machine learning processing within an embedded system in accordance with embodiments of the invention.

Referring to FIG. 8, a conceptual flowchart depicting a process 800 for utilizing machine learning processing within an embedded system in accordance with embodiments of the invention is shown. Prior to the utilization of machine learning generated inferences, many embodiments of the storage device log a plurality of data within an embedded data store, such as the log(s) 38 of FIG. 1 (block 810). As discussed above, the logged data can include any data generated within the storage device that may be recalled for later use within a machine learning model.

During the subsequent operation of the storage device, a measurement or other data set may be requested by an application or other software (block 815). Once the measurement is requested, a decision can be made to determine if a machine learning based inference is preferred over a traditional measurement (block 825). This determination can be made in a number of ways, including the use of a source selection logic, such as the source selection logic 214, as described in FIG. 6.

When it is determined that a machine learning based inference is needed, the contract source code can be accessed (block 830). Once accessed, process 800 can assemble an input vector from the logged data (block 840). An input vector can be described as a description of the various types, locations, and sizes of data to be obtained from a log that is needed to generate an input to a machine learning model. A completed input vector can be understood as a plurality of data that has been assembled and formatted to directly interface with the input of a machine learning model. Each machine learning model may require a unique input vector. In many embodiments, the input vector can be generated from contract data. It is contemplated that certain embodiments may assemble an input vector from data available outside of the internal logs (block 845). In these embodiments, process 800 may access other data within the storage device memory or may attempt to acquire data external to the storage device.

Once assembled, the input vector can be presented to the machine learning model for processing (block 850). Presentation of the input vector can occur in a number of ways, including, but not limited to, passing in the input vector as a variable of a function call. The presented input vector can then be processed within the machine learning model (block 860). The processing of the data will generate output data, typically in the form of an inference. The storage device can then utilize the machine learning model output data within the system (block 870). However, in many embodiments, the output data can be processed through a verification step prior to utilization within the storage device. A discussion of this process is outlined in more detail below.

Figure 9:
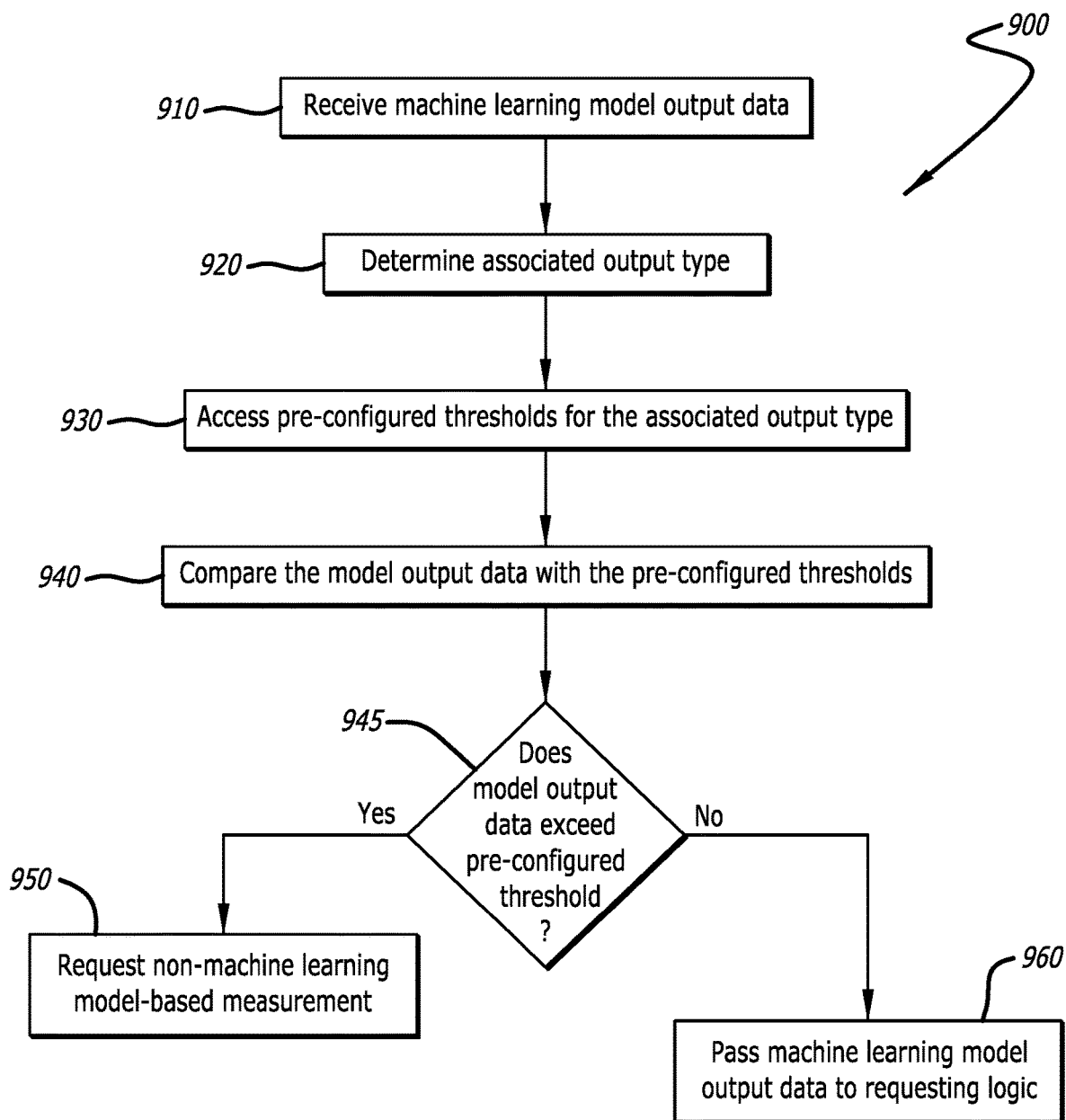
FIG. 9 is a conceptual flowchart depicting a process for verifying machine learning output data in accordance with an embodiment of the invention.

Referring to FIG. 9, a conceptual flowchart depicting a process 900 for verifying machine learning output data in accordance with an embodiment of the invention is shown. As discussed previously within FIG. 4, various embodiments may attempt to verify the output data generated by the machine learning models. This may be done to ensure the accuracy and applicability of the output data.

A process 900 for verifying model output data can initially receive machine learning model output data for evaluation (block 910). As discussed above, the format and type of data that may be generated from machine learning models can vary greatly and can be modified based on the desired application. Thus, process 900 will attempt to determine the associated output type of the generated inference (block 920).

By way of example and not limitation, the output type of a generated inference may be a truth value between 0 and 1 and, in other embodiments, may be configured as a plurality of configuration values associated with each head of a hard disk-based memory. Each type of output data structure and value can yield unique boundaries for what is classified as a valid output and a non-valid output. Thus, process 900 may access one or more preconfigured thresholds for the associated output type of the machine learning model (block 930).

When process 900 has obtained suitable threshold values for the received output data, a comparison can occur between the model output data and the preconfigured thresholds (block 940). Upon comparison, a determination can be made to evaluate if the model output data exceeds one or more of the preconfigured thresholds (block 945). Preconfigured thresholds may include, but are not limited to, error margins, median/mean values, standard deviation values, minimum and/or maximum values. In certain embodiments, the generated model output data (i.e., inference) may be associated with a plurality of constraints, dimensions, or other factors. In these embodiments, determination of exceeding thresholds may include determining if a particular number or range of values within the preconfigured thresholds have been exceeded. In some embodiments, the examination of output data may be looking for a change in data value between measurements. Finally, in additional embodiments, preconfigured thresholds may be combined between various types of output data to generate a determination.

If no thresholds have been exceeded, process 900 may then pass the machine learning model output data to the logic or other software that originated the request (block 960). In the event that one or more of the preconfigured thresholds have been exceeded, process 900 can subsequently issue a request for a traditional, non-machine learning model-based measurement to occur (block 950). In various embodiments, process 900 can direct the request to the non-machine learning-based method such that any output is directly passed to the requesting logic and/or software.

Referring to FIG. 10A, a diagram of a portion of a storage media in accordance with an embodiment of the invention is shown. As discussed previously, the surface of a hard disk 150 in an HDD can be broken up into zones of tracks called cylinders. Each track may be further broken into sectors. Groups of radially adjacent sectors on the adjacent tracks in a cylinder are called "wedges." If FIG. 10A represented an entire disk 150, the diagram would logically wrap around horizontally. However, for simplicity, only a portion of the disk 150 media needs to be considered.

This portion of disk 150 may have the cylinders running horizontally, each comprising a series of wedges. An exemplary wedge 1005 may be indicated, and all of the similarly sized squares in the diagram may represent a single wedge on the disk surface. It should be noted that in modern multi-terabyte HDDs, each cylinder may comprise hundreds of tracks, and the total number of sectors can be in the millions.

Conventionally, every wedge in the diagram would be tested and then designated fully functional (or "good") or defective (or "bad"). Defects may comprise multiple wedges. For example, the groups of wedges shaded and labeled 1010 and 1020 in the figure have been tested and found to be bad, while the remainder of the wedges have been tested and found to be good. These exemplary defect patterns will be used in subsequent figures.

Referring to FIG. 10B, a diagram of a portion of a storage medium in accordance with an embodiment of the invention is shown. Present in the figure may be groups of defective wedges 1010 and 1020 discussed above and an exemplary good wedge 1005. Conventionally, after all of the wedges have been tested, some adjacent to bad areas may then be margined. Since defects can change when operating in the field, certain adjacent good wedges are also labeled as bad to create a safety margin around the originally defective wedges. In the figure, the groups of wedges labeled 1012 and 1022 may be the safety margins conventionally included around the defective wedges 1010 and 1020, respectively.

Referring to FIG. 11, a diagram of a portion of a storage medium in accordance with an embodiment of the invention is shown. Since testing every wedge can be time consuming and increase the manufacturing costs of the storage device, it is highly desirable to find ways to minimize the total amount of test time performed at the factory. For example, as discussed earlier, only a portion of the cylinders may be tested and labeled good or bad at the factory. This may allow initial storage on the HDD (like, for example, loading an operating system), and then the HDD proceeds to test the remainder of its cylinders during idle times in the field.

Another approach illustrated in FIG. 11 may be to only test a portion of the cylinders and use machine learning to infer the correct evaluation of good or bad for the wedges on the untested cylinders. In the figure, we have a test pattern run on the same portion of the medium illustrated in FIGS. 10A and 10B. The remains of the defect patterns 1010 (not shown) and 1020 (not shown) may be indicated by 1010R and 1020R, respectively. Every second cylinder may have been tested like, for example, cylinder 1130, while the other cylinders like, for example, cylinder 1132, may not be tested. While only testing every other cylinder is illustrated in the diagram, testing less than half of the cylinders is contemplated in some embodiments. This testing is controlled and monitored by the Machine Learning Defect Management (MLDM) logic 211 (not shown) in conjunction with other logic(s). In some embodiments, both of these approaches may be employed.

Referring to FIG. 12A, a diagram of a portion of a storage medium in accordance with an embodiment of the invention is shown. Illustrated in the figure are tested cylinders like cylinder 1202 and untested cylinders like cylinder 1204. Also shown in the figure is a wedge 1206 that has tested as bad while all of the other tested wedges are good.

Referring to FIG. 12B, a diagram of a portion of a storage medium in accordance with an embodiment of the invention is shown. Present in the figures are tested cylinders like cylinder 1202, untested cylinders like cylinder 1204, and a wedge 1206 that tests as bad. Also illustrated in the figure is "Region of Influence" (RoI) 1208 surrounding bad wedge 1206. While shown as a square in the figure, in various embodiments, the RoI may be any of a variety of shapes when appropriate, including a square, a rectangle, a circle, an ellipse, a statistically determined random shape, etc. The actual dimensions may vary from embodiment to embodiment, and each may have a different size and shape appropriate to the instance.

The RoI may be a machine learning model derived from statistical data acquired from thoroughly testing many different devices and used by the MLDM logic 211 (not shown). This sort of data acquisition may be done in much finer detail than the relatively coarse testing done in production. Physically it may represent many failure patterns that can be discerned by machine learning models in the vicinity of known bad wedge 1206. The RoI model may make inferences about other wedges in the region of the known bad wedge as to whether they are good or bad. In inference may be a probability of a wedge near Referring to FIG. 12C, a diagram of a portion of a storage medium in accordance with an embodiment of the invention is shown. As illustrated in the figure, the RoI 1220 model may be applied to every tested bad wedge of the tested bad wedges illustrated in FIG. 11. The model may then infer the likelihood of whether an untested wedge is good or bad. This process is discussed in more detail below. The skipping of cylinders and the relatively fast execution speed of the machine learning models may significantly reduce the time spent in production testing.

Present in the figures are the remainder groups of wedges 1010R and 1020R, as discussed above in conjunction with FIGS. 10A, 10B, and 11. Each of the wedges comprising 1010R and 1020R has been measured and labeled as bad. The MLDM logic 211 (not shown) takes the data from these locations and applies the RoI 1220 model to each to determine whether the other wedges are labeled as good (like wedge 1210) or bad (like wedges 1212). The machine learning approach generates essentially the same pattern of bad wedges as in the conventional case but with roughly half the test time.

Figure 13A:
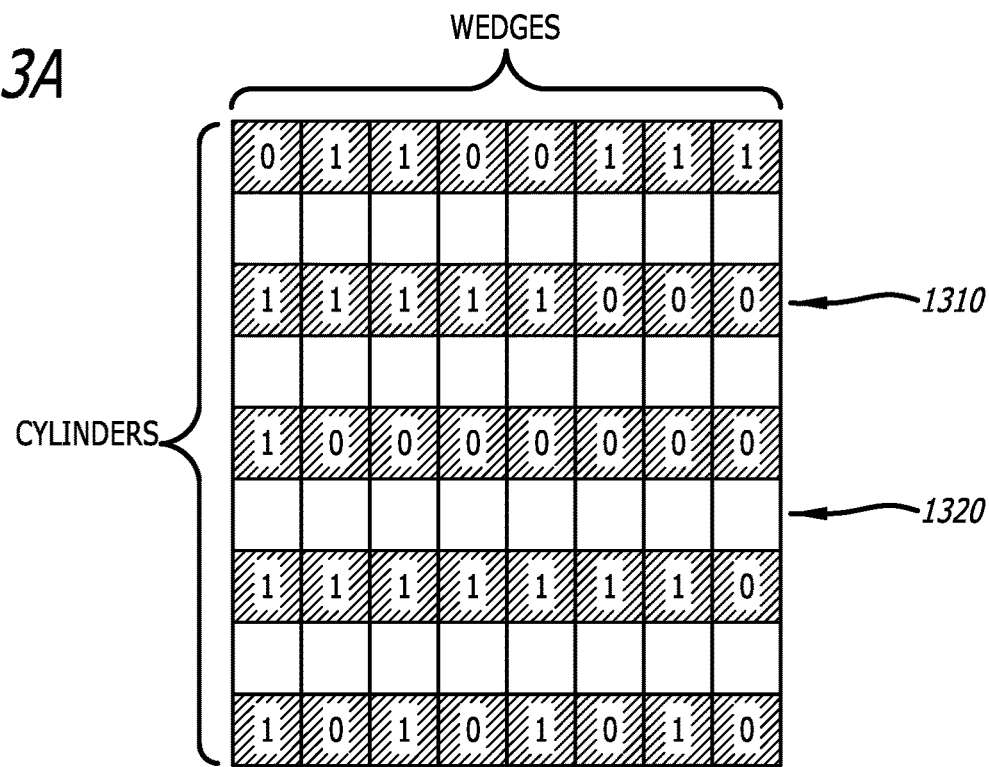
FIG. 13A is a diagram of a portion of a storage medium in accordance with an embodiment of the invention.

Referring to FIG. 13A, a diagram of a portion of a storage medium in accordance with an embodiment of the invention is shown. Illustrated in the figures are rows of tested cylinders (like cylinder 1310) and untested cylinders (like cylinder 1320). Each of the tested cylinders may have a value of 0=good or 1=bad. These values may be passed to the RoI model in MLDM 211 (not shown). It should be noted that the tested cylinders may have hundreds of tracks, and the data that is passed to MLDM 211 (not shown) in a practical application may be more detailed than a simple 0 for good or 1 for bad in a practical application. In some embodiments, additional contextual information may be added. For example, the tested data may comprise a vector of floating point numbers.

In some embodiments, the zeros and ones of the inputs to the MLDM 211 (not shown) are converted into vectors. Also, different types of errors may be sent to the RoI model. In certain embodiments, there may be data errors (where the medium of the HDD is damaged) and servo errors (where the positioning of the head 136 [not shown] is incorrect).

Figure 13B:
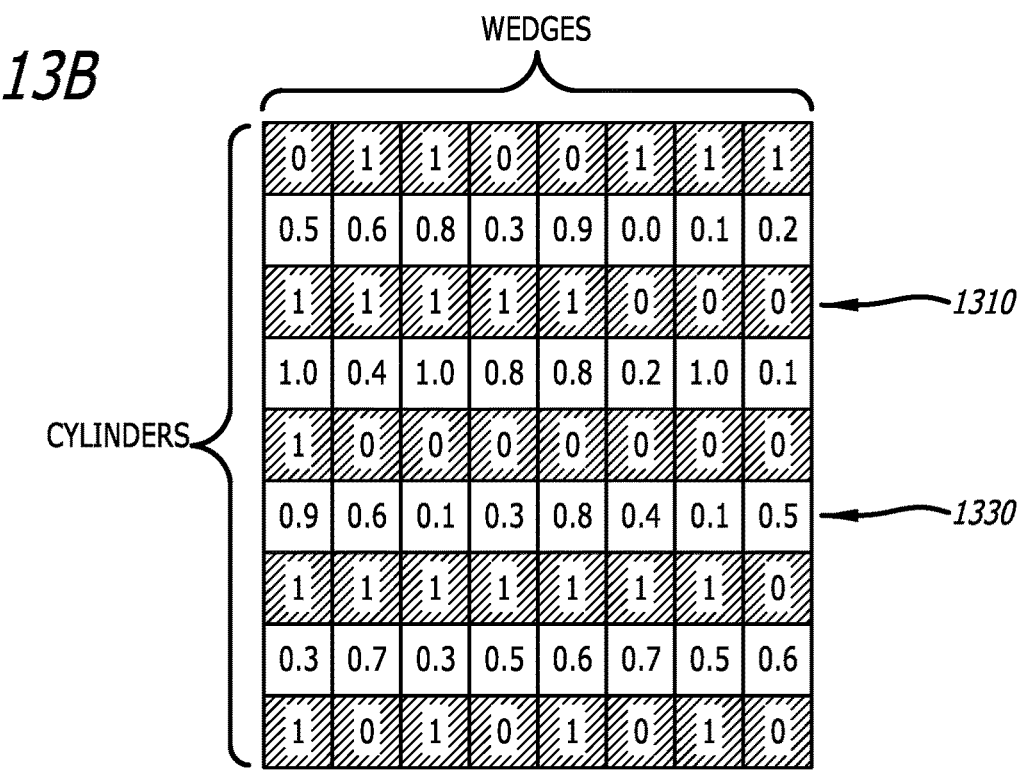
FIG. 13B is a diagram of a portion of a storage medium in accordance with an embodiment of the invention.

Referring to FIG. 13B, a diagram of a portion of a storage medium in accordance with an embodiment of the invention is shown. Illustrated in the figure are tested cylinders (like cylinder 1310) and untested cylinders (like cylinder 1330). Each wedge in the untested tracks may have an intermediate result from the RoI algorithm executed in the MLDM 211 (not shown). The results may be real numbers from 0.0 to 1.0 and indicate the probability of that wedge being bad (e.g., close to 1.0) or good (e.g., close to 0.0), as inferred by the machine learning models. These are known as intermediate outputs of the machine learning models. To get a final determination, a threshold may be applied to each intermediate output to get a result of 0 or 1. This is the equivalent of an activation function applied in the last layer of the neural network (like layer 306), as discussed in conjunction with FIG. 3 above.

Figure 13C:
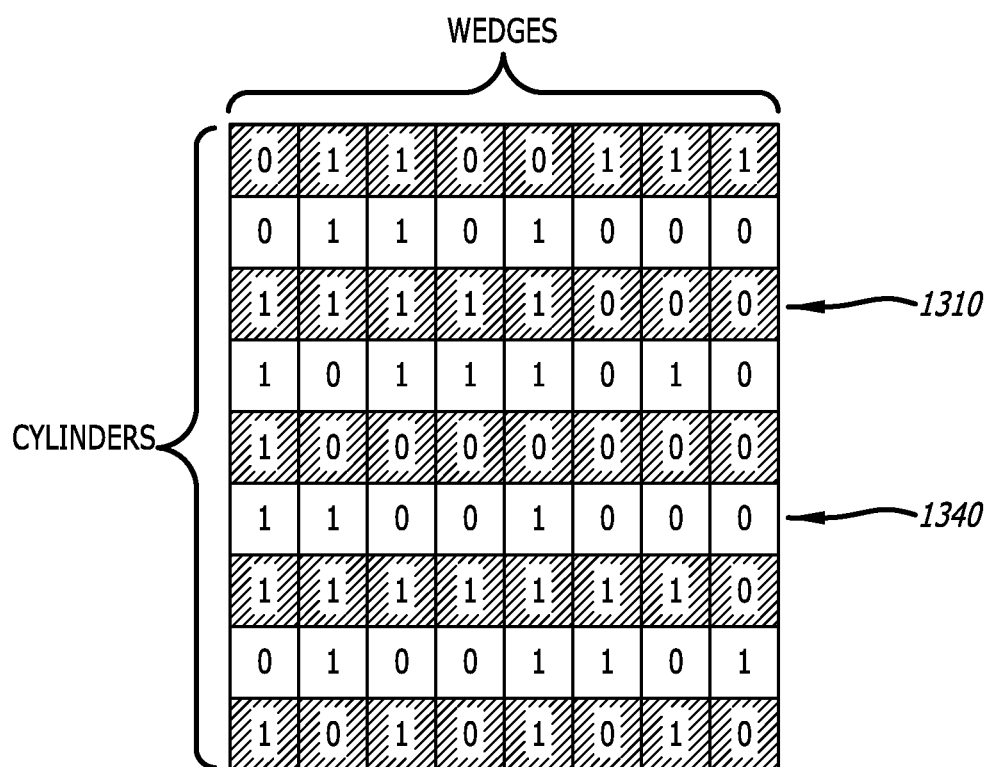
FIG. 13C is a diagram of a portion of a storage medium in accordance with an embodiment of the invention.

Referring to FIG. 13C, a diagram of a portion of a storage medium in accordance with an embodiment of the invention is shown. Illustrated in the figure are tested cylinders (like cylinder 1310) and untested cylinders (like cylinder 1340). The untested wedges in the untested cylinders like 1340 may be given a final value of 0 or 1 after the application of an activation function to the intermediate outputs. In certain embodiments, the activation function may take the form of a threshold expressed by Equation 1 (where "x" is the intermediate result and "y" is the output value):

$$\text{If } x > 0.5 \text{ then } y = 1, \text{ else } y = 0 \quad \text{(Equation 1)}$$

Persons skilled in the art will appreciate that other activation functions may be used in different embodiments.

Figure 14:
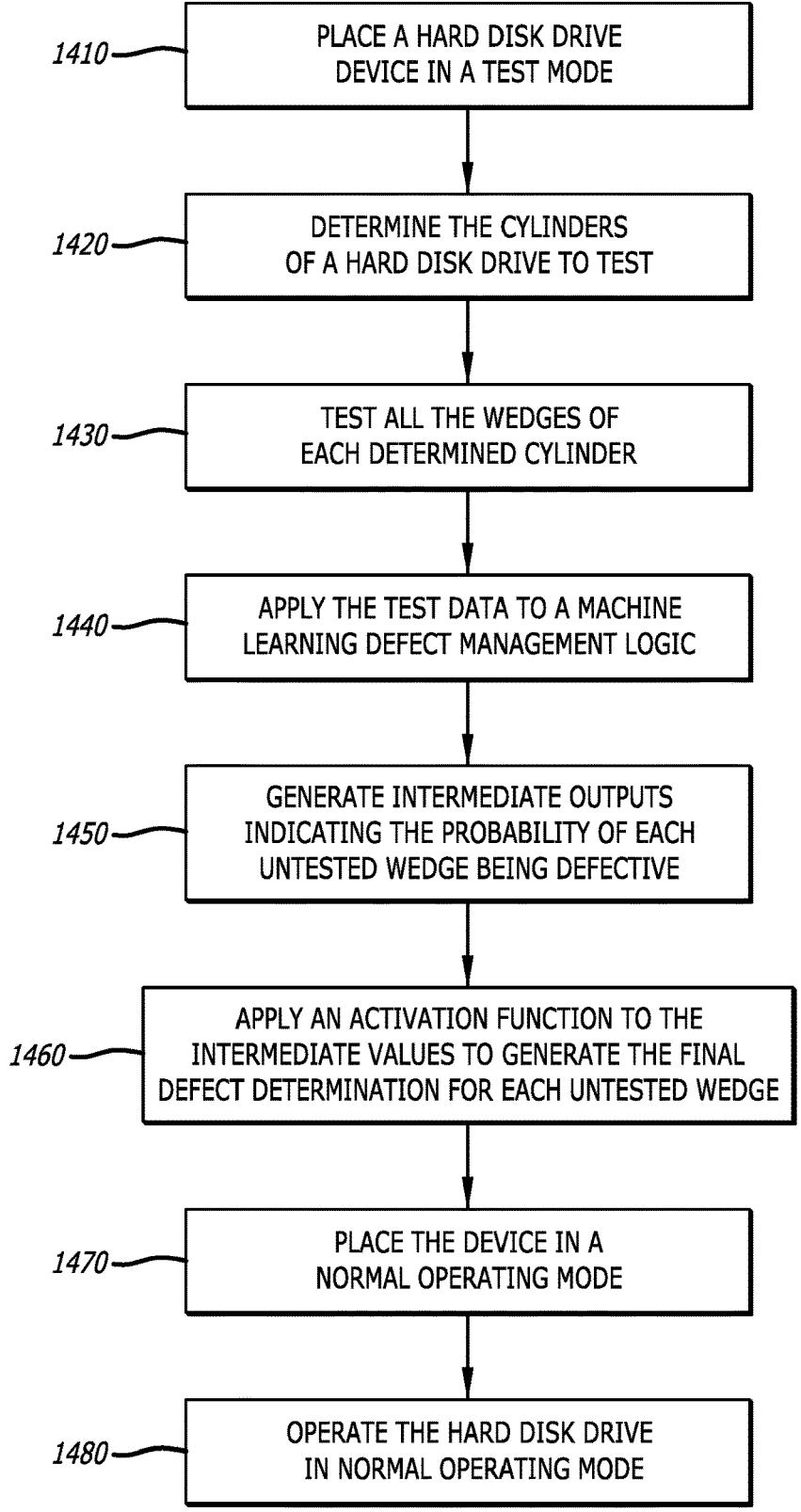
FIG. 14 is a conceptual flowchart depicting a process for applying machine learning output data in accordance with an embodiment of the invention.

Referring to FIG. 14, a conceptual flowchart depicting a process 1400 for applying machine learning output data in accordance with an embodiment of the invention is shown. Process 1400 may begin with placing an HDD in a test operating mode (block 1410) and determining which cylinders of the HDD to test (block 1420). The number of cylinders to test may be the result of a statistical analysis of HDD error rates and patterns as well as the machine learning algorithms to be employed. The number of cylinders tested may be half of the cylinders, a third of the cylinders, or some other fraction of the total number of cylinders.

The testing of the wedges in the determined cylinders (block 1430) results in data to be input to the machine learning algorithm (block 1440). The data obtained for each wedge may be a simple good/bad determination or a more detailed data pattern for determining where any defects occur in the tested defective wedge to improve the accuracy of the machine learning model.

The machine learning model may generate intermediate outputs for the untested wedges (block 1450). Various machine learning techniques such as convolutional neural networks, feed-forward convolutional networks, or long short-term memory networks may be employed. These intermediate outputs represent the probability that each untested wedge is defective or bad. The analysis may be performed internally to the HDD utilizing a processor in an SoC or some other method like, for example, an external host or an external disk drive tester.

An activation function may be applied to the intermediate outputs to make a final determination if the untested wedges are good or bad (block 1460). The final determination for all wedges, tested and untested, will be a good/bad (or not-defective/defective) value. When testing is complete, the HDD may be placed in a normal operating mode (block 1470) and then operated as an HDD (block 1480). In various embodiments, a portion of the testing may be done internally to the HDD in the field.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public, regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:
1. A device, comprising:
   a rotating disk;
   a head actuated over the disk;
   a plurality of concentric data tracks disposed on the disk, wherein:
      the tracks are grouped into cylinders,
      the tracks are partitioned into radially-adjacent sectors, and
      radially-adjacent sectors in the cylinders are grouped into wedges; and
   control circuitry comprising a Machine Learning Defect Management (MLDM) logic, wherein the MLDM logic is configured to:
      select a portion of the cylinders for testing;
      test the wedges in the selected cylinders for defects;
      input the results of the detected defective wedges to one or more machine learning models; and
      use the one or more machine learning models to infer the defective or non-defective status of the wedges in untested cylinders.

2. The device of claim 1, wherein:
the device is configured to operate in a first operating mode to test for defects; and
the device is configured to operate in a second operating mode to perform read and write operations for an external host.

3. The device of claim 2, wherein the first operating mode is performed as part of the manufacturing process for the device.

4. The device of claim 2, wherein the first operating mode is performed after the manufacturing process for the device.

5. The device of claim 1, wherein the one or more machine learning models are updated after the manufacturing process for the device.

6. The device of claim 1, wherein the tested wedges in the selected cylinders are from different cylinders.

7. The device of claim 1, wherein each of the defects detected is of a type from a group consisting of: data defects and servo defects.

8. The device of claim 1, wherein each of the machine learning models is of a type from a group consisting of: convolutional neural networks, feed-forward convolutional networks, and long short-term memory networks.

9. A method for managing defects in a device comprising a disk with a plurality of concentric data tracks disposed on the disk, the tracks grouped into cylinders and divided into sectors of which radially-adjacent sectors are grouped into wedges, the method comprising:
determining a portion of the cylinders for testing;
testing the wedges in the determined cylinders for defects;
applying results of the detected defects to one or more machine learning models; and
inferring defective or non-defective status for the wedges in the untested cylinders.

10. The method of claim 9, further comprising:
changing the operating mode of the device to a first operating mode to test for defects; and
changing the operating mode of the device to a second operating mode to perform read and write operations for an external host.

11. The method of claim 10, wherein the first operating mode is performed as part of the manufacturing process for the device.

12. The method of claim 10, wherein the first operating mode is performed after the manufacturing process for the device.

13. The method of claim 9, wherein the one or more machine learning models are updated after the manufacturing process for the device.

14. The method of claim 9, wherein the tested wedges in the determined cylinders are from different cylinders.

15. The method of claim 9, wherein each of the defects detected is of a type from a group consisting of: data defects and servo defects.

16. The method of claim 9, wherein each of the machine learning models are is of a type from a group consisting of: convolutional neural networks, feed-forward convolutional networks, and long short-term memory networks.

17. A non-transitory computer-readable storage medium configured to store data and instructions to be executed by one or more processors, where the instructions, when executed by the one or more processors, cause a device to perform:
determining a portion of a plurality of cylinders of a disk for testing, wherein the disk comprises a plurality of concentric data tracks disposed on the disk, the tracks grouped into the plurality of cylinders and divided into sectors of which radially-adjacent sectors are grouped into wedges;
testing the wedges in the determined cylinders for defects;
applying results of the detected defects to one or more machine learning models; and
inferring defective or non-defective status for the wedges in untested cylinders.

18. The computer-readable storage medium of claim 17, wherein the instructions, when executed by the one or more processors, cause the device to further perform:
changing the operating mode of the device to a first operating mode to test for defects; and
changing the operating mode of the device to a second operating mode to perform read and write operations for an external host;
wherein the first operating mode is performed as part of the manufacturing process for the device.

19. The computer-readable storage medium of claim 17, wherein the one or more machine learning models are updated after the manufacturing process for the device.

20. The computer-readable storage medium of claim 17, wherein:
each of the defects detected is of a type from a group consisting of: data defects and servo defects, and
each of the machine learning models is of a type from a group consisting of: convolutional neural networks, feed-forward convolutional networks, and long short-term memory networks.

21. A device comprising the computer-readable storage medium of claim 17 and one or more processors configured to execute the instructions on the computer-readable storage medium.

22. The device of claim 21 wherein the device comprises means for testing configured to test a disk drive comprising the disk.

23. The device of claim 21 wherein the device is a data storage system comprising a plurality of disk drives and the disk is in one of the plurality of disk drives.

* * * * *